(12) United States Patent
Grossman et al.

(10) Patent No.: US 9,460,057 B2
(45) Date of Patent: Oct. 4, 2016

(54) THEME-BASED MEDIA CONTENT GENERATION SYSTEM AND METHOD

(71) Applicants: Andrew Grossman, Hopkins, MN (US); Kenneth F. Krutsch, Minnetonka, MN (US); Richard Monson-Haefel, Edina, MN (US)

(72) Inventors: Andrew Grossman, Hopkins, MN (US); Kenneth F. Krutsch, Minnetonka, MN (US); Richard Monson-Haefel, Edina, MN (US)

(73) Assignee: FILMSTRIP, INC., Minneapolis, MN (US)

( * ) Notice: Subject to any disclaimer, the term of this patent is extended or adjusted under 35 U.S.C. 154(b) by 738 days.

(21) Appl. No.: 13/834,347

(22) Filed: Mar. 15, 2013

(65) Prior Publication Data
US 2014/0281929 A1 Sep. 18, 2014

Related U.S. Application Data

(63) Continuation-in-part of application No. 13/832,177, filed on Mar. 15, 2013.

(51) Int. Cl.
*G06F 17/21* (2006.01)
*G11B 27/031* (2006.01)
*H04N 21/231* (2011.01)
(Continued)

(52) U.S. Cl.
CPC ........... *G06F 17/212* (2013.01); *G11B 27/031* (2013.01); *H04N 21/23109* (2013.01); *H04N 21/25816* (2013.01); *H04N 21/25841* (2013.01); *H04N 21/2743* (2013.01); *H04N 21/41407* (2013.01); *H04N 21/4223* (2013.01); *H04W 4/023* (2013.01); *G06F 17/25* (2013.01); *H04W 4/043* (2013.01)

(58) Field of Classification Search
CPC .. G06F 17/25; G06F 17/212; G06F 17/2264; G06F 17/227
USPC ....... 715/200, 201, 202, 203, 204, 243, 253, 715/273, 255
See application file for complete search history.

(56) References Cited

U.S. PATENT DOCUMENTS 7,673,248 B2 3/2010 Narayanaswami
8,234,586 B2 * 7/2012 Glein ................ G06F 8/38
715/810

(Continued)

OTHER PUBLICATIONS

Feb. 17, 2016 USPTO Office Action (U.S. Appl. No. 13/832,744)—Our Matter 4985.

(Continued)

*Primary Examiner* — Stephen Hong
*Assistant Examiner* — Gregory J Vaughn
(74) *Attorney, Agent, or Firm* — Beck Tysver Evans, PLLC

(57) ABSTRACT

A computerized system and method are presented that creates implicit content on a mobile device by monitoring and recording input from sensors on the device. Using the metadata and event identification, the content is created into clusters, which can be confirmed by the user as actual events. Events can then be grouped according to metadata and event information into a presentation grouping. Presentation groupings can be presented using a map and timeline interface, and can be augmented using content from external sources, other users, or viewers of the content. Themes can be created for presentation groupings that format the presentation groupings according to stored formatting appropriate to the theme. Themes can suggest theme events to which users can assign places and times. Information about future theme events can then be used to trigger a request for content or to trigger the creation of implicit content.

24 Claims, 18 Drawing Sheets

(51) Int. Cl.
*H04N 21/258* (2011.01)
*H04N 21/2743* (2011.01)
*H04N 21/414* (2011.01)
*H04N 21/4223* (2011.01)
*H04W 4/02* (2009.01)
*G06F 17/25* (2006.01)
*H04W 4/04* (2009.01)

(56) References Cited

U.S. PATENT DOCUMENTS

| | | |
|---|---|---|
| 8,327,284 B2 | 12/2012 | Marusich et al. |
| 8,515,460 B2 | 8/2013 | Greenberg |
| 8,645,855 B2 | 2/2014 | Marusich et al. |
| 8,745,057 B1 | 6/2014 | Li |
| 8,745,617 B1 | 6/2014 | Stekkelpak et al. |
| 8,879,890 B2 | 11/2014 | Luo et al. |
| 8,963,962 B2* | 2/2015 | Ubillos ............ H04L 51/24 345/661 |
| 9,009,159 B2 | 4/2015 | Bernhardt et al. |
| 9,009,596 B2 | 4/2015 | Ortiz |
| 9,043,276 B2* | 5/2015 | Kiilerich ............ H04L 67/06 707/621 |
| 2004/0177149 A1 | 9/2004 | Zullo et al. |
| 2004/0210480 A1* | 10/2004 | Muller ............ G06Q 30/0267 705/14.64 |
| 2007/0136773 A1 | 6/2007 | O-Neil et al. |
| 2008/0032739 A1 | 2/2008 | Hoodbhoy et al. |
| 2008/0109718 A1 | 5/2008 | Narayanaswami |
| 2009/0249249 A1* | 10/2009 | Glein ............ G06F 8/38 715/810 |
| 2009/0313679 A1 | 12/2009 | Mcafee et al. |
| 2009/0327288 A1* | 12/2009 | Silverman ......... G06F 17/30038 |
| 2010/0082239 A1 | 4/2010 | Hardy et al. |
| 2010/0088297 A1* | 4/2010 | Kiilerich ............ H04L 67/06 707/705 |
| 2010/0175001 A1 | 7/2010 | Lazarus et al. |
| 2010/0251101 A1 | 9/2010 | Haussecker et al. |
| 2011/0167357 A1 | 7/2011 | Benjamin et al. |
| 2012/0042036 A1 | 2/2012 | Lau et al. |
| 2012/0054660 A1 | 3/2012 | Marusich |
| 2012/0116559 A1 | 5/2012 | Davis et al. |
| 2012/0210220 A1 | 8/2012 | Pendergast et al. |
| 2012/0213493 A1 | 8/2012 | Luo et al. |
| 2012/0224743 A1 | 9/2012 | Rodriguez et al. |
| 2012/0240142 A1 | 9/2012 | Rose |
| 2013/0132836 A1 | 5/2013 | Ortiz |
| 2013/0159868 A1 | 6/2013 | Marusich et al. |
| 2013/0198602 A1* | 8/2013 | Kokemohr ........ G06F 17/30011 715/233 |
| 2013/0238724 A1* | 9/2013 | Cunningham .......... H04L 51/24 709/206 |
| 2013/0238990 A1* | 9/2013 | Ubillos ............ H04L 51/24 715/708 |
| 2013/0239031 A1* | 9/2013 | Ubillos ............ H04L 51/24 715/765 |
| 2013/0239055 A1* | 9/2013 | Ubillos ............ H04L 51/24 715/815 |
| 2013/0239063 A1* | 9/2013 | Ubillos ............ H04L 51/24 715/838 |
| 2013/0275880 A1 | 10/2013 | Bachman et al. |
| 2014/0140675 A1 | 5/2014 | De Sa et al. |
| 2014/0236709 A1 | 8/2014 | Aguayo et al. |

OTHER PUBLICATIONS

Jun. 2, 2015 USPTO Office Action (U.S. Appl. No. 13/832,744)—Our Matter 4985.
Sep. 23, 2015 USPTO Office Action (U.S. Appl. No. 13/832,177)—Our Matter 4967.

* cited by examiner

THEME-BASED MEDIA CONTENT GENERATION SYSTEM AND METHOD

CROSS REFERENCE TO RELATED APPLICATION

This application is a continuation-in-part of U.S. patent application Ser. No. 13/832,177, filed Mar. 15, 2013 (the '177 application). The application is also related to U.S. patent application Ser. No. 13/832,744, filed Mar. 15, 2013, which is itself a continuation-in-part of the '177 application. Both of these applications are hereby incorporated by reference in their entireties.

FIELD OF THE INVENTION

The present application relates to the field of computerized systems that organize and display media content.

SUMMARY

An embodiment of the present invention creates implicit content on a mobile device by monitoring and recording input from sensors on the device. This embodiment also analyzes metadata from the implicit content and metadata from explicit content created by a user for the purpose of creating content clusters, which are confirmed by the user as actual events. Events can then be grouped according to metadata and event information into a presentation grouping. Presentation groupings can be presented to a using an interface having a timeline, map, and content sections. Presentation groupings can include augmentation content, including external augmentation content taken from the Internet based on the location and time information in the displayed event.

Themes can be developed and associated with a presentation grouping. Each theme can have pre-defined theme events. Theme events can be planned for the future, or can be used to identify existing media content already created by the user. Future theme events can prompt a user to take content at events that will fit into the theme. Themes include formatting that can be tied to the theme events, allowing user created content to be inserted into professional designed, story-based themes for presentation to viewers.

DETAILED DESCRIPTION

System Overview

Figure 1:
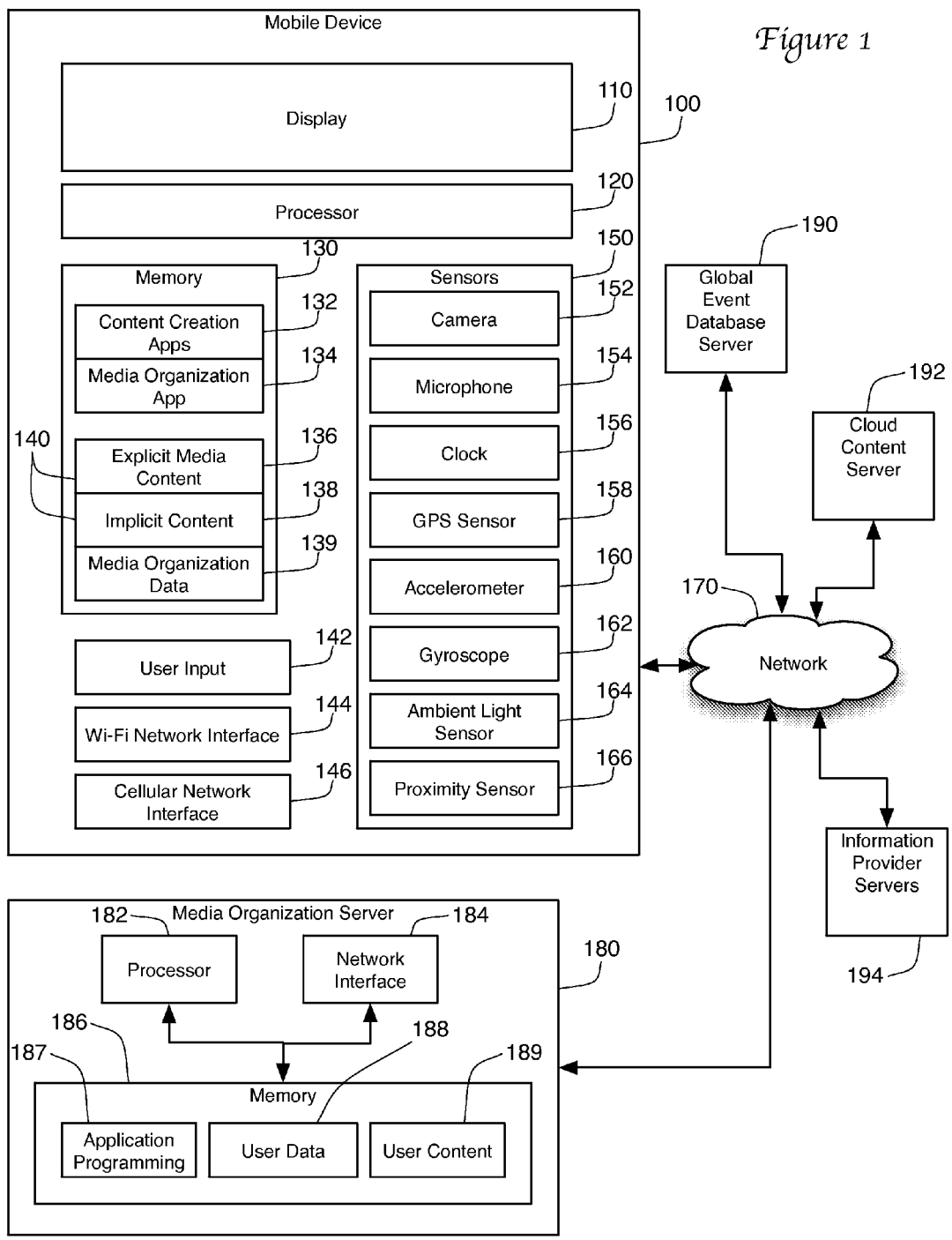
FIG. 1 is a schematic diagram showing a mobile device and a plurality of servers communicating over a network.

FIG. 1 shows a mobile device 100 utilizing one embodiment of the present invention. The mobile device 100 can communicate over a wide area network 170 with a plurality of computing devices. In FIG. 1, the mobile device 100 communicates with a media organization server 180, a global event database server 190, one or more cloud content servers 192, and a third-party information provider server 194.

The mobile device 100 can take the form of a smart phone or tablet computer. As such, the device 100 will include a display 110 for displaying information to a user, a processor 120 for processing instructions and data for the device 100, a memory 130 for storing processing instructions and data, and one or more user input interfaces 142 to allow the user to provide instructions and data to the mobile device 100. The display 110 can be use LCD, OLED, or similar technology to provide a color display for the user. In some embodiments, the display 110 incorporates touchscreen capabilities so as to function as a user input interface 142. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 100 generally use specific operating systems designed for such devices, such as iOS from Apple Inc. (Cupertino, Calif.) or ANDROID OS from Google Inc. (Menlo Park, Calif.). The operating systems are stored on the memory 130 and are used by the processor 120 to provide a user interface for the display 110 and user input devices 142, handle communications for the device 100, and to manage applications (or apps) that are stored in the memory 130. The memory 130 is shown in FIG. 1 with two different types of apps, namely content creation apps 132 and a media organization app 134. The content creation apps 132 are apps that create explicit media content 136 in the memory 130, and include video creation apps, still image creation apps, and audio recording apps. The media organization app 134 creates implicit content 138. The media organization app 134 is responsible for gathering the different types of explicit media content 136 and the implicit content 138 (referred to together as content 140), analyzing the content 140, and then organizing the content 140 into clusters, events, and presentation groupings that are stored in media organization data 139 as described below.

The mobile device 100 communicates over the network 170 through one of two network interfaces, namely a Wi-Fi network interface 144 and a cellular network interface 146. The Wi-Fi network interface 144 connects the device 100 to a local wireless network that provides connection to the wide area network 170. The Wi-Fi network interface 144 preferably connects via one of the Institute of Electrical and Electronics Engineers' (IEEE) 802.11 standards. In one embodiment, the local network is based on TCP/IP, and the Wi-Fi network interface includes TCP/IP protocol stacks. The cellular network interface 146 communicates over a cellular data network. The provider of the cellular data network then provides an interface to the wide area network 170. In one embodiment, the wide area network 170 is the Internet.

The mobile device 100 uses sensors 150 for a variety of purposes on the device 100. In the present embodiment, the sensors 150 provide the means to create media content 136. The content creation apps 132 respond to signals from the user input 142 to capture media content 136 using the camera sensor 152 and the microphone 154. These types of media content 136 are known as "explicit media content" because the user has explicitly requested that the mobile device 100 capture and store this media content 136. For instance, a user might instruct a photo taking app 132 to take a still photograph using the camera 152, or to stitch together a stream of input from the camera sensor 152 into a panorama image that is stored as explicit media content 136. A movie app 132 might record input from the camera 152 and microphone 154 sensors as a video file 136. Or a voice memo app 132 might record input from the microphone sensor 154 to create an audio media content file 136. In each case, these content creation apps 132 respond to an explicit request from a user to create the media content 136. In most cases, the explicit media content 136 is stored as a file or a data record in the memory 130 of the mobile device 100. This file or data record includes both the actual content recorded by the sensors 150 and metadata associated with that recording. The metadata will include the date and time at which the media content 136 was recorded, as determined by the clock 156. Frequently, the metadata also includes a geographic location where the media content 136 was created. The geographic location can be determined from the GPS sensor 158, or by using other location identifying techniques such as identifying nearby Wi-Fi networks using the Wi-Fi Network Interface 144, or through nearby cell tower identification using the cellular network interface 146. Some content creation apps 132 will include facial recognition capabilities in order to tag the identity of individuals within a photo or video file 136. Other apps 132 will allow a user a manually tag their files 136 so as to identify the individuals (or "participants") portrayed in those media files 136. These identity tags can then be added to the metadata stored with the media content file 136 in memory 130.

In some embodiments, the explicit media content 136 will be stored remotely on a cloud content server 192. For example, all photographs taken by the camera 152 may be stored in memory 130 as explicit media content 136 and may also be transmitted over one of the network interfaces 144, 146 to the cloud content server 192. The locally stored explicit media content 136 may be temporary in nature, with permanent storage provided on the cloud content server 192. In some circumstances, the cloud content server 192 will be provided by a third party, such as the FLICKR service provided by Yahoo! Inc. of Sunnyvale, Calif.

The media organization app 134 creates implicit content 138 by monitoring the sensors 150 on the mobile device 100 and storing related data as implicit content 138 when it monitors an interesting change in the sensors 150. For instance, the media organization app 134 might be monitoring the GPS sensor 158 and accelerometer 160 during a family driving vacation from Chicago, Ill. to Yellowstone National Park in Wyoming. The accelerometer 160 can indicate when the family car stops, and then determine the location of the mobile device 100 using the GPS sensor 158. By monitoring the accelerometer 160 and the GPS sensor 158 (at least periodically), the media organization app 134 can determine that the car was stopped during this family vacation for 3 hours, 15 minutes in Wall, S. Dak. This data could be stored as implicit content 138 in the memory 130.

When the app 134 creates this implicit content 138, it may also uses one of the network interfaces 144, 146 to obtain additional information about this implicit content 138. For example, the app 134 may contact a global event database server 190 that contains information about a great number of events (or "occurrences"). This type of database server 190, which is provided by several third parties over the Internet 170, allows users to specify a geographic location and a time, and the server 190 will respond with information about occurrences happening near that location around that time. The information returned from the global event database server will generally include a title for the occurrence, a description for that occurrence, a time period during which that occurrence takes place, and an exact physical location for that occurrence. For example, during the stop in Wall, S. Dak., the app 134 may inquire whether there are any events happening in Wall at the time the vehicle was stopped. The event database server 190 may indicate that at this time, a parade was happening in downtown Wall. The app 134 may also make inquiries from different information provider servers 194, such as a server 194 that provides weather information for a particular geographic location. By acquiring this information from external database sources 190, 194, the media organization app 134 would be able to create implicit content 138 indicating that from 12:15 to 3:30 pm on Jul. 4, 2013, the user of the mobile device 100 stopped in Wall, S. Dak. and witnessed a parade in sunny, 92 degree weather.

The media organization app 134 can take advantage of any of the sensors 150 on the mobile device 100, including the camera 152, microphone 154, clock 156, GPS sensor 158, accelerometer 160, gyroscope 162, ambient light sensor 164, and proximity sensor 166. The app 134 can define monitoring modes that determine the extent to which it monitors the various sensors 150. For instance, in one monitoring mode the app 134 could provide reverse geocoding by periodically (or continually) recording a location for the user from the GPS sensor 158. In another mode, the app 134 could monitor the accelerometer to indicate when the user is moving or has stopped moving. In a third mode, the app 134 could periodically monitor the microphone 154. If no interesting noises were detected, the app 134 would wait for the next interval before it again monitored the microphone 154. If interesting noises were detected (e.g., noises that were characteristic of human voices), the app 134 could record a small amount of the conversation and record it as implicit content 138 in memory 130, along with the time and location at which the conversation was recorded. In a fourth mode, the use of another app, such as one of the content creation apps 132, triggers the creation of an implicit content file 138. For instance, the use of a photo or movie app 132 may cause the media organization app 134 to record the GPS location, the current weather, and the current event, if any, noted by the global event database server 190. In addition, the app 132 in this fourth mode may record sounds from the microphone 154 to capture conversations between the user of the mobile device 100 and her photography subjects. These conversations would be stored as implicit content 138 in memory 130.

When requested by the user, the media organization app 134 collects the content 140 from the memory 130 (and from cloud content servers 192) and organizes the content 140 into content clusters. Content clusters are groups of content 140 that are grouped together as belonging to a particular occurrence or event. As described below, content clusters are presented to the user for modification and verification, after which the content groupings are referred to as user-verified events. Events may involve numerous elements of content 140, or may involve only a single element of content 140. In the preferred embodiment, the content clusters and events are stored in media organization data 139. In addition, the content clusters and events could be stored on a media organization server 180 accessible by the mobile device 100 over the network 170.

The media organization server 180 contains a programmable digital processor 182, such as a general purpose CPU manufactured by Intel Corporation (Mountain View, Calif.) or Advanced Micro Devices, Inc. (Sunnyvale, Calif.). The server 180 further contains a wireless or wired network interface 184 to communicate with remote computing devices, such as mobile device 100, over the network 170. The processor 182 is programmed using a set of software instructions stored on a non-volatile, non-transitory, computer readable medium 186, such as a hard drive or flash memory device. The software typically includes operating system software, such as LINUX (available from multiple companies under open source licensing terms) or WINDOWS (available from Microsoft Corporation of Redmond, Wash.).

The processor 182 performs the media organization functions of server 180 under the direction of application programming 187. Each user of the server 180 is separately defined and identified in the user data 188. The media organization app 134 can assist the user in creating an account on the media organization server 180. The account can require a username and password to access user content 189 that is stored on the server 180 on behalf of the users identified in data 188. The media organization server 180 can operate behind the media organization app 134, meaning that the user of the mobile device 100 need only access the server 180 through the user interface provided by the app 134. In addition, the media organization server 180 can provide a web-based interface to the user content 189, allowing a user to access and manipulate the user content 189 on any computing device with web access to the Internet 170. This allows users to organize their user content 189 and format presentations of that data 189 via any web browser.

Because the media organization server 180 contains information about content clusters and events created by a number of users, this server 180 can easily create its own database of past occurrences and events that could be useful to the media organization app 134 when clustering media. For instance, a first user could cluster media about a parade that they witnessed between 12:30 and 1:30 pm in Wall, S. Dak. on Jul. 4, 2013. The user could verify this cluster as a user-verified event, and could add a title and description to the event. This data would then be uploaded to the user data 188 on server 180. At a later time, a mobile device 100 of a second user could make an inquiry to the media organization server 180 about events that occurred in downtown Wall, S. Dak. at 1 pm on Jul. 4, 2013. The server 180 could identify this time and location using the event created by the previous user, and return the title and description of the event to the mobile device 100 of the second user. In effect, the media organization server 180 could become a crowd-sourced event database server providing information similar to that provided by server 190 (except likely limited to past and not future events).

Content Handling

Figure 2:
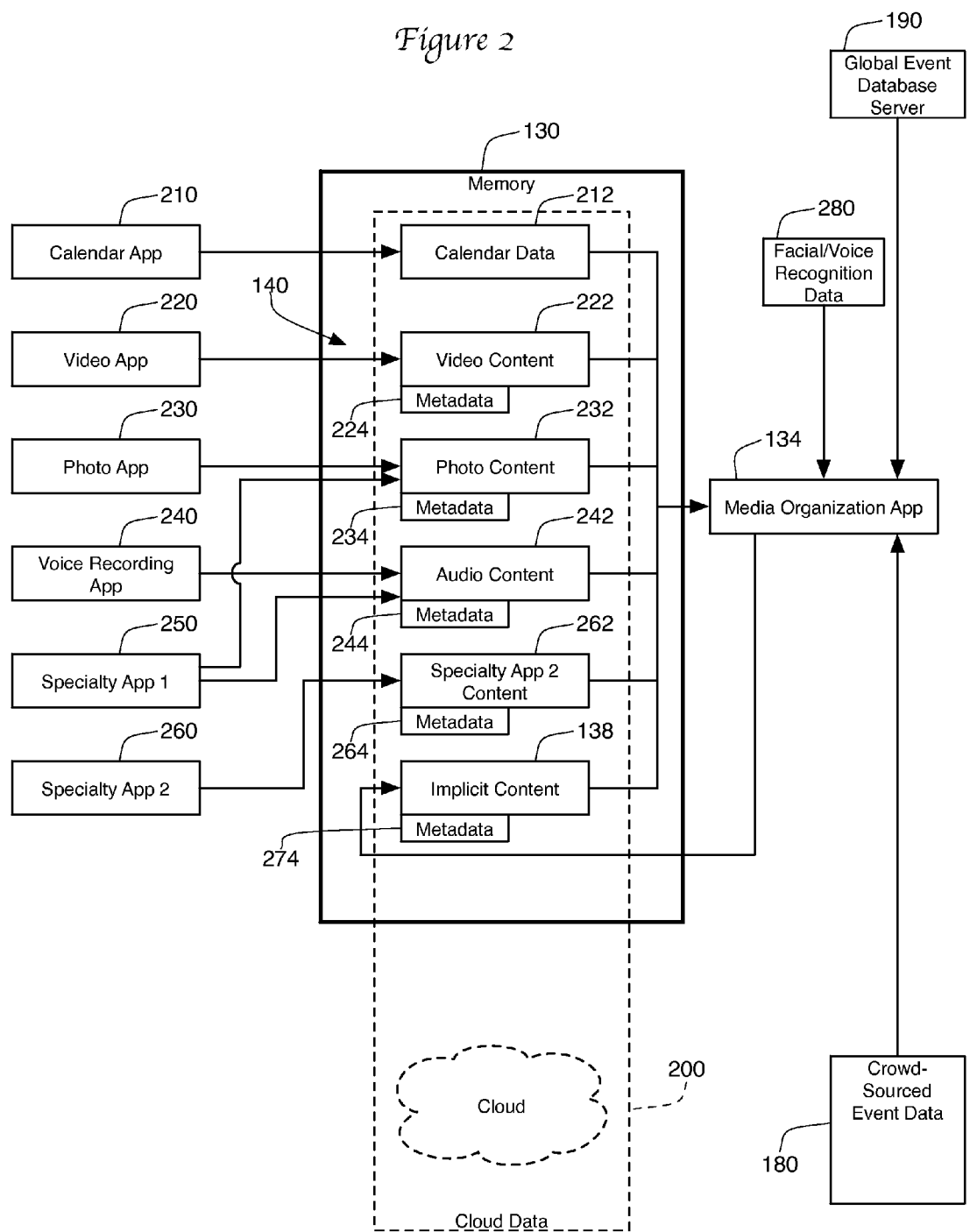
FIG. 2 is a schematic diagram of showing an application accepting input to form a content cluster.

FIG. 2 schematically illustrates the interaction of the media organization app 134 with content 140 and the other inputs that allow the media organization app 134 to create content clusters. In one embodiment, the content 140 is found in the physical memory 130 of the mobile device 100. In another embodiment, this data 140 is found on "the cloud" 200, meaning that the data is stored on remote servers 180, 192 accessible by the mobile device 100 over network 170. The dual possible locations for this content 140 is shown in FIG. 2 by locating the data 140 both within memory box 130 and the dotted cloud storage box 200.

The explicit media content 136 shown in FIG. 2 includes video content 222, photo content 232, and audio content 242. The video content 222 is created by a video app 220 running on the processor 120 of the mobile device 100. When the video content 222 is created, it is stored along with metadata 224 that describes the video content 222, including such information as when and where the video was created. Similarly a photo app 230 creates the photo content 232 and its related metadata 234, and a voice-recording app 240 creates audio content 242 and metadata 244. These three apps 220, 230, 240 may be standard apps provided along with the mobile operating system when the user purchased the mobile device 100. The data 222, 232, 242 from these apps 220, 230, 240 are stored in known locations in the local memory 130 or on the cloud data system 200.

Third party or specialty apps 250, 260 can also create explicit content 136 that is accessed by the media organization app 134. The first specialty app 250 creates both photo content 232 and audio content 242, and stores this data 232, 242 and related metadata 234, 244 in the same locations in memory 130 where the standard apps 230, 240 provided with the device 100 store similar data. The second specialty app 260 also creates explicit media content 262 and related metadata 264, but this content 262 is not stored in the standard locations in memory 130. However, as long as the media organization app 134 is informed of the location of this specialty app content 262 on memory 130, such content 262 can also be organized by the app 134.

In addition to the explicit content 222-262, the media organization app 134 also organizes implicit content 138 and its metadata 274. In one embodiment, this implicit content 138 is created by the same app 134 that organizes the content 140 into content clusters. In other embodiments, the media organization app 134 is split into two separate apps, with one app monitoring the sensors 150 and creating implicit content 138, and the other app 134 being responsible for organizing content 140.

FIG. 2 also shows a calendar app 210 creating calendar data 212 on the mobile device 100. In one embodiment, this data can be used by the media organization app 134 as it arranges content 140 into content clusters. As explained below, the calendar data 212 may have explicit descriptions describing where the user was scheduled to be at a particular time. The media organization app 134 can use this data to develop a better understanding about how to organize content 140 that was acquired at that same time. The app 134 also receives additional information about occurrences and events from the global event database server 190 and the crowd-sourced event data from the media organization server 180. The data from these sources 180, 190 is also very useful to the app 134 as it organizes the content 140.

The app 134 accesses all this content 140, from the same locations in which the data was originally stored by the creating apps 210-260 and organizes it into content clusters using additional data from servers 180 and 190. In most cases, the content 140 is organized based primarily on the metadata 224, 234, 244, 254, 264, and 274 that was attached to the content 140 by the app that created the content 140. In some circumstances, the media organization app 134 can augment the metadata. For instance, the app 134 could use facial recognition (or voice recognition) data 280 available on the mobile device 100 or over the network 170 to identify participants in the content 140. Such recognition can occur using the processor 120 of the mobile device, but in most cases it is more efficient to use the processing power of a cloud content server 192 or the media organization server 180 to perform this recognition. Regardless of where it occurs, any matches to known participants will be used by the app 134 to organize the content 140.

Example Content Clusters, Events, and Presentation Grouping

Figure 3:
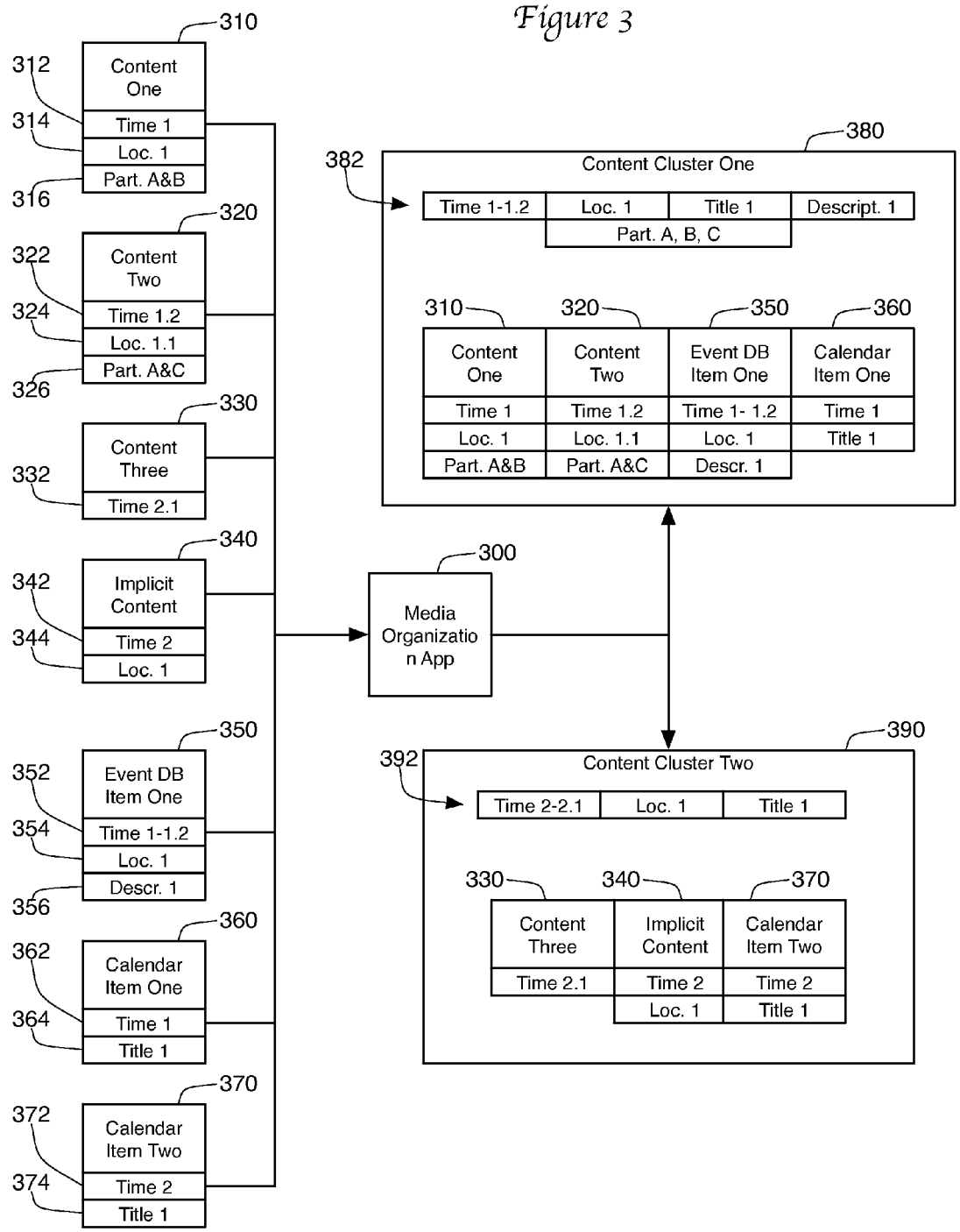
FIG. 3 is a schematic diagram showing content being clustered by a media organization app.

FIG. 3 shows an example of one embodiment of a media organization app 300 organizing a plurality of items 310-370 into two content clusters 380, 390. In this case, there are three items of explicit content, namely content one 310, content two 320 and content three 330. Content one 310 is associated with three items of metadata 312-316, which indicate that content one 310 was acquired at time "Time 1" (312), at location "Loc. 1" (314), and that participants A and B participate in this content (metadata 316). Content one 310 could be, for example, a photograph of A & B, taken at Time 1 and Loc. 1. Similarly, the metadata 322-326 for content two 320 indicates that it was acquired at time "Time 1.2" (slightly later than time "Time 1"), location "Loc. 1.1 " (close to but not the same as "Loc. 1"), and included participants A & C. The metadata for content three 330 indicates only that it occurred at time "Time 2.1".

In addition to the three explicit content items 310, 320, 330, the media organization app 300 is also organizing one implicit content item 340, which has metadata indicating that it was taken at time "Time 2" and location "Loc. 1". The media organization app 300 has also obtained data 350 from one of the event database servers 180, 190. This data 350 indicates (through metadata 352-356) that an event with a description of "Descr. 1" occurred at location "Loc. 1" for the duration of "Time 1-1.2". Finally, the app 300 pulled relevant information form the calendar data 212 and discovered two relevant calendar events. The first calendar item 360 indicates that the user was to be at an event with a title of "Title 1" at time "Time 1", while the second calendar item 370 describes an event with a title of "Title 1" at time "Time 2".

The media organization app 300 gathers all of this information 310-370 together and attempts to organize the information 310-370 into content clusters. In this case, the app 300 identified a first cluster 380 consisting of explicit content one 310, explicit content two 320, event database information 350, and calendar item one 360. The media organization app 300 grouped these items of data 310, 320, 350, 360 primarily using time and location information. The app 300 recognized that each of these items occurred at a similar time between "Time 1" and "Time 1.2". Furthermore, to the extent that the items 310, 320, 350, 360 identified a location, the location was either "Loc. 1" or close by location "Loc. 1.1". One advantage of using calendar data 212 or data from event databases 180, 190 is that some of this data 212, 180, 190 will identify not just a single time but an actual time duration. For instance, the calendar data 212 may indicate that a party was scheduled from 6 pm to 2 am. Based on this duration information, the media organization app 300 will be more likely to cluster content from 6 pm and content at 1 am as part of the same event. Similarly, the calendar data 212 may identify a family camping trip that lasts for two days and three nights, which might cause the app 300 to group all content from that duration as a single event.

Once the media organization app 300 identifies items 310, 320, 350, 360 as being part of the cluster 380, it stores this information in media organization data 139 on the mobile device 100. This information may also be stored in the user content 189 stored for the user on the media organization server 180. The information about cluster 380 not only identifies items of data 310, 320, 350, 360, as belonging to the cluster, but also aggregates the metadata from these items into metadata 382 for the entire content cluster 380. This metadata 382 includes metadata from the explicit content 310-320, which indicated that this content within this cluster 380 occurred during the time duration of "Time 1-1.2" and at location "Loc. 1." The metadata from content 310 and 320 also indicated that this content involved participants A, B, and C. In addition, because the media organization app 300 accessed the calendar data 212 and the data from the event database servers 180, 190, the content cluster metadata 282 can also indicate that this content relates to an event with the title "Title 1" having a description "Descr. 1".

The second content cluster 390 grouped together explicit content 330, implicit content 340, and calendar item two 370 primarily because these items 330, 340, 370 all occurred at time "Time 2" or soon thereafter ("Time 2.1") and indicated either that they occurred at the same location ("Loc. 1") or did not indication a location at all. The cluster metadata 392 for this content cluster 390 indicates the time frame ("Time 2-2.1") and location ("Loc. 1") taken from the explicit content 330 and the implicit content 340. The metadata 392 also includes the title "Title 1" from calendar item 2, which was linked with the others items 330, 340 by the common time frame.

An important feature of this embodiment of the present invention is that the clustering of content 380, 390 is done automatically without user involvement. The user only needs to create explicit content 136 with their mobile device 100 using their normal content creation apps 132. These apps 132 save their explicit content 136 as usual. The media organization app 300 can run in the background creating implicit content 138 (pursuant to earlier user instructions or preference settings). At a later time, the media organization app 300 gathers the content 140, makes inquiries from external event databases 180, 190, examines the user calendar data 212, and then creates content clusters 280, 290 for the user. This later time can be when the media organization app 300 is opened by the user and the user requests that the content clustering step occur. Alternatively, this later time can occur periodically in the background. For instance, the user may request through preference settings that the content clustering and database inquiries take place every night between midnight and two a.m., but only when the mobile device 100 is plugged into a power source.

Figure 4:
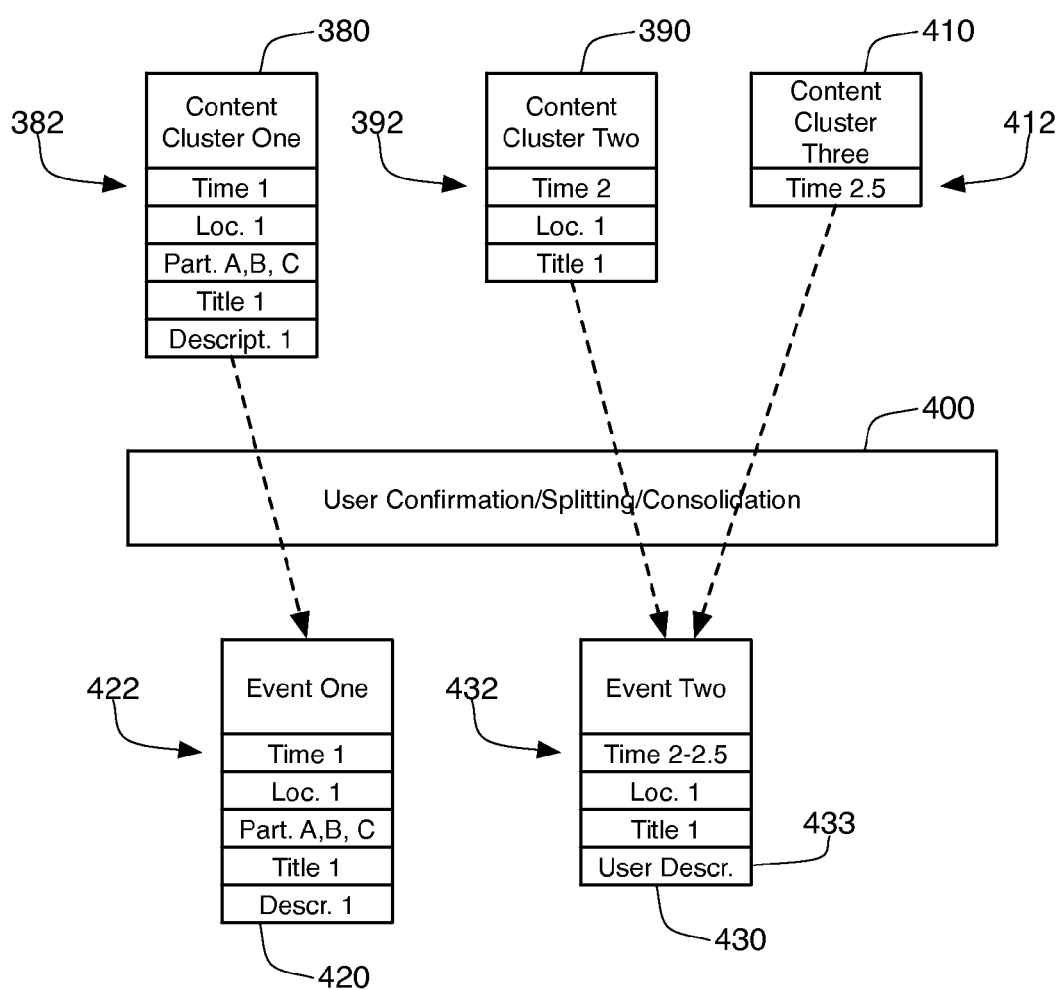
FIG. 4 is a schematic diagram showing content clusters being confirmed as events through a user interface.

Because the content clustering shown in FIG. 2 takes place without user involvement, the media organization app 300 preferably gives the user the right to affirm or correct these clusters 380, 390. In FIG. 4, content cluster one 380, cluster two 390, and a third content cluster 410 are presented to a user through a user interface, represented in FIG. 4 by element 400. The user interface 400 presents these clusters 380, 390, 410 and their contents for the user to review. The user can confirm a cluster as accurate and complete, as this user did with content cluster one 380. When a cluster 380 is confirmed, the media organization app 300 will consider the cluster to be a user-confirmed event, such as event one 420 shown in FIG. 4. Note that event one 420 contains the same metadata 382 that the content cluster 380 had before it was confirmed Sometimes the user will wish to consolidate two different clusters into a single event. In FIG. 4, the media organization app 300 created separate clusters 390, 410, with cluster Two 390 occurring at time "Time 2" and cluster three 410 occurring at time "Time 2.5." While the app 300 viewed these time frames as different enough as to create two separate clusters 390, 410, the user in FIG. 4 chose to combine the separate clusters 390, 410 into a single user-confirmed event two 430. Note that the metadata 432 for event two 430 includes a time frame "Time 2-2.5" derived from the metadata 392, 412 of both of the original content clusters 390, 410. The event two metadata 432 also can contain user added additions, such as the user description 433 of this event 430.

Each user-defined event includes one or more content items 140 that relate to a particular event that was likely attended by the user. The event might be a wedding, a party with a friend, or a child's swim meet. By clustering the content 140 together into events 420, 430, the user can better appreciate the content 140. Furthermore, these events 420, 430 are enhanced by the addition of implicit content 138, and by the added data from calendar data 212 or one of the event databases 180, 190.

Figure 5:
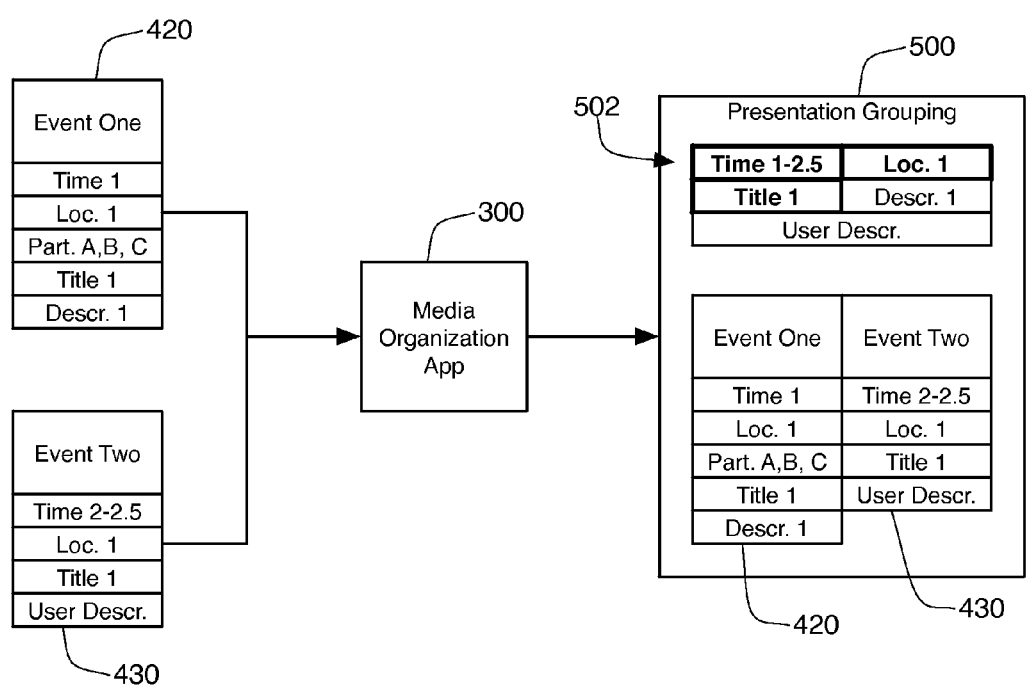
FIG. 5 is a schematic diagram showing events being clustered into a presentation grouping by the media organization app.

In FIG. 5, the media organization app 300 is being used to establish a presentation grouping 500. A presentation grouping 500 is a grouping of two or more events according to a common subject for presentation together. The presentation may be slide show, a video file, a web site, or some unique combination that combines the media from multiple events 420, 430 into a single presentation. Events 420, 430 are grouped together by a common theme or subject. It is possible that some events 420, 430 will be grouped into multiple presentation groupings 500, while other events will not be grouped into any presentation groupings 500.

In FIG. 5, event one 420 is shown having title "Title 1" taken from the calendar item one 360 and event two 430 also has a title of "Title 1" taken from calendar item two 370. The media organization app 300 recognizes this commonality, and then suggests that these two events 420, 430 be combined into a single presentation grouping 500. This grouping 500 contains both events 420, 430, and has metadata 502 taken from the metadata 422, 432 of the two events 420, 430. In FIG. 5, metadata 502 that was shared by all events 420, 430 in the presentation grouping 500 are bolded (namely the timeframe "Time 1-2.5", the location "Loc. 1" and the title "Title 1"), which indicates that these elements in the metadata 502 are most likely to apply to the presentation grouping as a whole 500.

Frequently, many events will be combined into a single presentation grouping 500. For instance, a user may have ten calendar entries all labeled "Third Grade Swim Meet." Although this parent attended all ten swim meets, the parent took pictures (i.e., created explicit media content 136) at only six of these meets. The media organization app 300 will cluster this content 136 into six content clusters, with each cluster also containing a calendar entry with the same "Third Grade Swim Meet" title. Because of this commonality, the app 300 will automatically create a presentation grouping 500 containing content 136 from all six swim meets without including intervening content that is not related to the swim meets.

It is true that, in the example shown in FIG. 5, these two events 420, 430 may not have been grouped in a single presentation grouping 500 if the user had not created calendar entries with the same title "Title 1" for each event. While they shared the same location ("Loc. 1"), this might not have been enough commonality for the app 300 to group the events 420, 430 together. However, if these events were swim meets and were sponsored by an organization that posted every meet in the global event database server 190, this presentation grouping 500 could still be created. As long as one item in a cluster identifies a location and another identifies a time, then the global event database server 190 should be able to identify any events were scheduled at the same location and time. Each event 420, 430 would then include the identification of the event received from the global event server 190, and the media organization app 300 would be able to group the same events 420, 430 as a presentation grouping 500.

Alternatively, another parent of a child in the third grade swim team may have created and labeled events using the media organization app 300. When this data was uploaded to the media organization server 180, the server 180 would now have knowledge of these swim meets. When the next user attempts to cluster content taken at the same swim meets, the media organization app 300 would query the server 180 and receive an identification of these swim meets, which would be added into their own events 420, 430.

Clustering Methods

Figure 6:
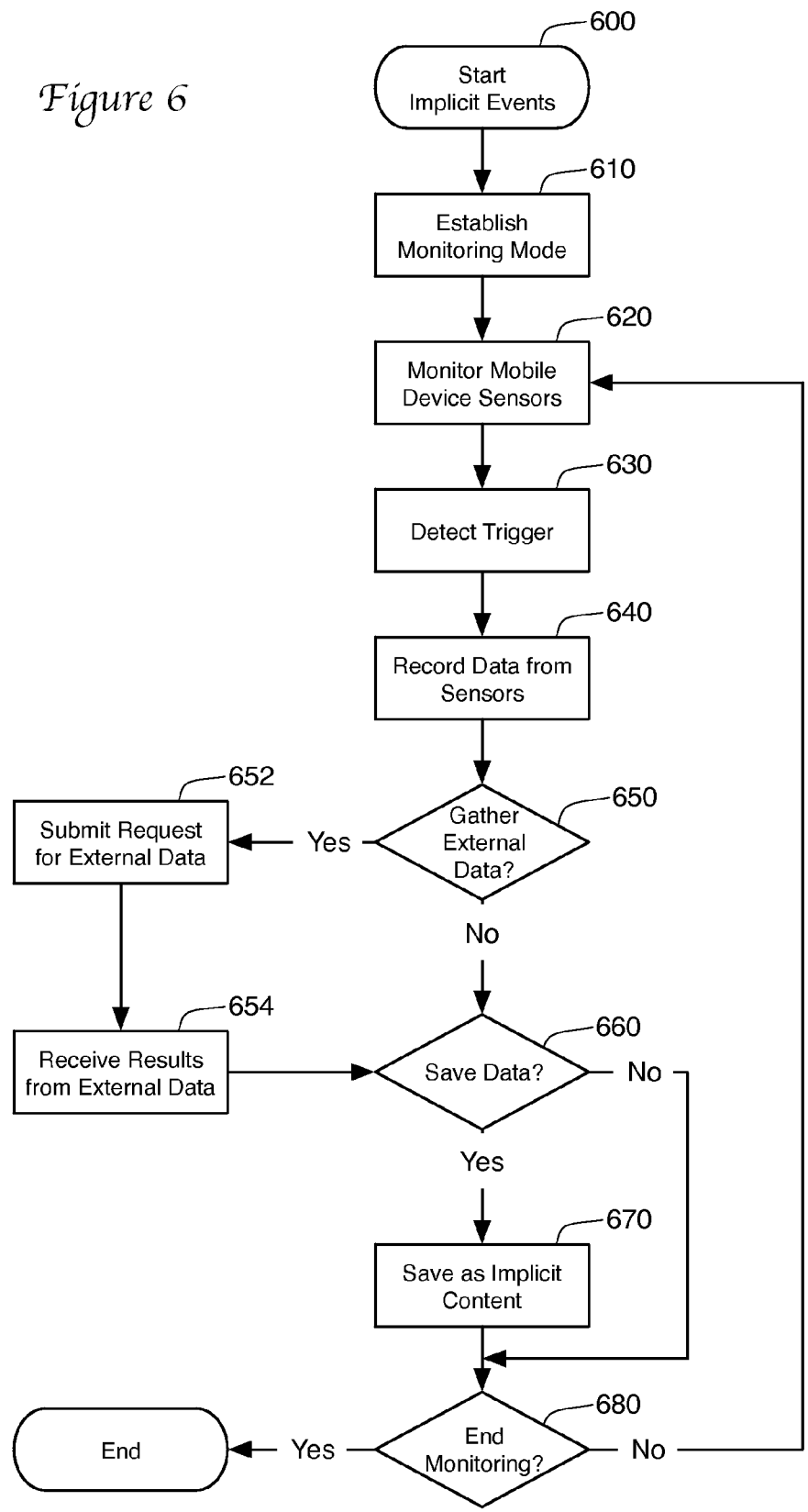
FIG. 6 is a flow chart showing a method for generating implicit content.

FIG. 6 shows a method 600 that is used to create implicit content 138 on the mobile device 100. The method begins at step 610, during which a user selects a particular mode to be used to monitor the sensors 150 of the mobile device 100. The selected monitoring mode establishes which of the sensors 150 will be monitored by the method 600, and also establishes a trigger that will be use to start recording data. For example, a walking tour mode could be established in which an accelerometer is routinely (every few seconds) measured to determine whether an individual is currently walking (or running). A trigger event could be defined to detect a change in the walking status of the individual (e.g., a user who was walking is now standing still, or vice versa). Alternatively, the trigger could require that the change in status last more than two minutes. This alternative walking tour mode would be designed to record when the user starts walking or stops walking, but would not record temporary stops (for less than two minutes). So a user that is walking down a path may meet a friend and talk for ten minutes, and then continue down the path. When the user reaches a restaurant, the user stops, has lunch, and then returns home. This mode would record when the user started walking, when the user stopped to talk to a friend, when the user started again, when the user ate lunch, when the user finished lunch and stared walking home, and when the user returned home. This mode would not record when the user stopped to get a drink of water (because the user stopped for less than two minutes), or when the user got up at lunch to wash his hands (because the user walked for less than two minutes). Other modes might include a car trip mode, which would monitor an accelerometer and GPS device to record car stops that lasted longer than an hour, or a lunch conversation mode, which randomly monitors the microphone to listen for human voices and records one minute of the conversation if voices are recognized. The point of selecting a monitoring mode in step 610 is to ensure that the user approves of the monitoring of the sensors 150 that must be done to create implicit content 138, and that the user desires to create this type of content 138.

Once the mode is established, the processor 120 will monitor the sensors 150 of the mobile device 100 at step 620 looking for a triggering event. The sensors 150 to be monitored and the triggering event will be determined by the selected monitoring mode. If the processor 120 detects a trigger at step 630, the processor 120 will record data from the sensors 150 in step 640. Note that the data recorded from the sensors 150 does not have to be limited to, or even include, the sensor data that was used to detect the trigger in step 630. For instance, the triggering event may be that the user took their cellular phone 100 out of their pocket. This could be determined by monitoring the accelerometer 160 and the ambient light sensor 164. When this occurs, the processor 120 might record the location of the device 100 as indicated by the GPS sensor 158, the current time as indicated by the clock 156, and the next two minutes of conversation as received by the microphone 154.

Step 650 determines whether data from external sources are to be included as part of this implicit content 138. Such data may include, for example, the weather at the currently location of the device 100, or the presence of mobile devices 100 belonging to friends in the general proximity. If step 650 determines that external data will be included, a request for external data is made in step 652, and the results of that request are received in step 654. For example, the media organization app 134 might request local weather information from another app on the mobile device 100 or from a weather database 194 accessible over the network 170. Alternative, a "locate my friends" app that detects the presence of mobile devices belong to a user's friend could be requested to identify any friends that are nearby at this time. The data from these apps or remote servers is received at step 654, and combined with the data recorded from the sensors 150 at step 640.

At step 660, a determination is made whether to save this accumulated data. In some circumstances, a monitoring mode may establish that the data gathered after a triggering event (step 630) is always to be stored as an implicit content 138. In other circumstances, the monitoring mode may impose requirements before the data can be saved. For instance, the lunch conversation mode may not save the recorded audio as implicit content 138 if analysis of the recording indicates that the voices would be too muffled to be understood. If the condition for saving the data under the monitoring mode is met at step 660, then the data (including both sensor data recorded at step 640 and external data received at step 654) is recorded as implicit content at 670. If the step 660 determines that the condition is not met, step 270 is skipped. At step 680, the process 600 either returns to monitoring the device sensors 150 at step 620, or ends depending on whether additional monitoring is expected by the monitoring mode.

Figure 7:
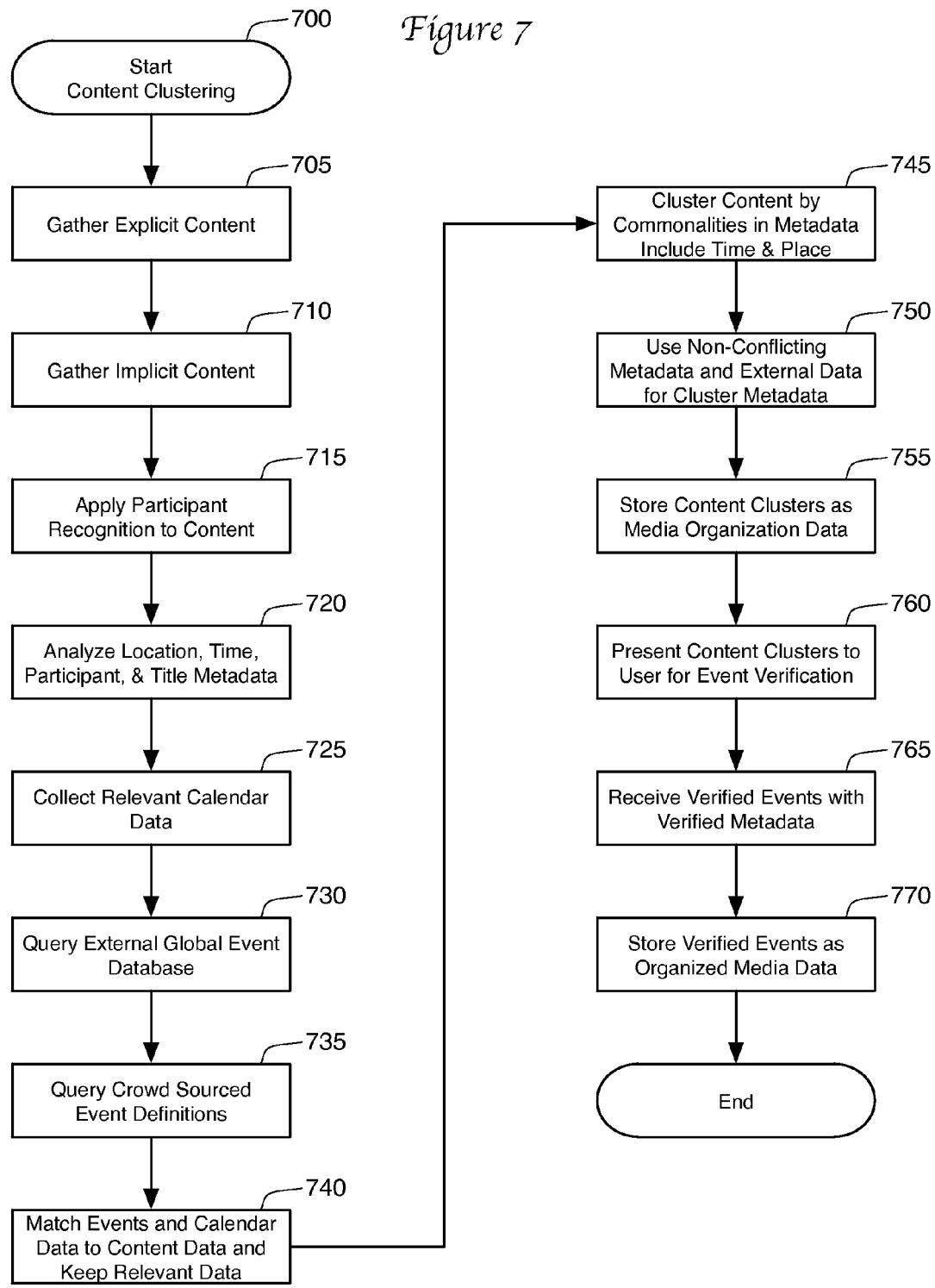
FIG. 7 is a flow chart showing a method for content clustering.

FIG. 7 shows a method 700 for clustering content 140 into content clusters. The process 700 starts at step 705 by gathering the explicit content 136 from the memory 130 on the mobile device 100, a cloud storage server 192, or both. Next the implicit content 138 is gathered at step 710, again either from memory 130 or from user content storage 189 at server 180. These steps 705, 710 may gather all information available at these data locations, or may only search for new content 140 added since the last time the app 134 organized the content 140.

At step 715, the media organization app 134 accessing facial or voice recognition data 280 in order to supplement the participant information found in the metadata for the gathered content 140. Of course, this step 715 could be skipped if participant information was already adequately found in the metadata for the content 140, or if no participant recognition data 280 were available to the app 134.

At step 720, the media organization app 134 analyses the metadata for the content 140, paying particular attention to location, time, participant, and title metadata (if available) for the content 140. Using the time information taken from the content 140, the app 134 analyzes the calendar data 212 looking for any calendar defined events that relate to the content 140 being analyzed (step 725). In addition, the app 134 uses time and location information from the content 140 to search for occurrence information from one or more third party event databases 190 (step 730). The app 134 also makes a similar query at step 735 to the crowd-sourced event definitions maintained by the media organization server 180. If the calendar data or the responses to the queries made in steps 730, 735 contain data that is relevant to the content 140 being analyzed, such data will be included with the content 140 at step 740.

At step 745, the content 140 and the relevant data from steps 725-735 are clustered together by comparing metadata from the content 140 and the added data. In one embodiment, clusters are based primarily on similarities in time metadata. In this embodiment, the app 134 attempts to group the content 140 by looking for clusters in the time metadata. In other embodiments, location metadata is also examined, whereby the app 134 ensures that no content cluster contains data from disparate locations.

At step 750, metadata is created for the content clusters by examining the metadata from the content 140 and the additional data obtained through steps 725-735. The clusters are then stored in the media organization data 139 in memory 130, in the user content 189 of the media organization server 180, or both.

At step 760, the automatically created content clusters are presented through a user interface to a user for confirmation as user-confirmed events. The user can confirm a cluster without change as an event, can split one cluster into multiple events, or combine two or more clusters into a single event. The app 134 receives the verified events from the user interface at step 765. The user can also confirm and supplement the metadata, adding descriptions and tags to the metadata as the user sees fit. Finally, the verified events are saved in step 770 with the media organization data 139 in memory 130, and/or in the user content 189 of the media organization server 180. As explained above, these data locations 139, 189 can be designed to hold only the organizational information for the content 140 while the content 140 itself remains in its original locations unaltered. Alternatively, all of the organized content 140 can be gathered and stored together as user content 189 stored at the media organization server 180. While this would involve a large amount of data transfer, the media organization app 134 can be programmed to upload this data only in certain environments, such as when connected to a power supply, with access to the Internet 170 via Wi-Fi Network Interface 144, and only between the hours of midnight and 5 am. Alternatively, this data could be uploaded continuously to the remote media organization server 180 in the background while the mobile device 100 is otherwise inactive or even while the device 100 is performing other tasks.

Figure 8:
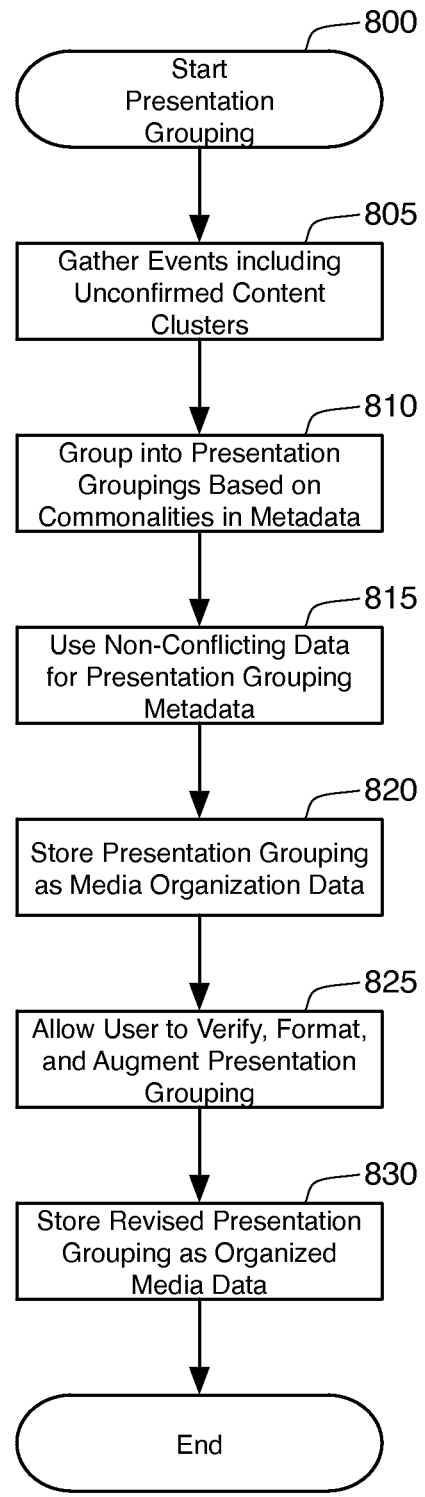
FIG. 8 is a flow chart showing a method for the grouping of events into presentation groupings.

FIG. 8 shows a method 800 for grouping events into presentation groupings. This method 800 starts at step 805, wherein events are identified by the media organization app 134 for grouping. Step 805 might be limited to clusters that have formally become user-verified events through steps 765 and 770. Alternatively, the process 800 may include unverified content clusters stored at step 755. At step 810, the app 134 examines the metadata for each event and cluster, and then attempts to find commonalities between the events and clusters. As explained above, these commonalities can frequently be based upon event information obtained from calendar data 212 or from data obtained by outside event data 180, 190.

In one embodiment, step 810 uses commonality in the metadata that does not relate to closeness-in-time. The reason for this is that content that was collected close to the same time as other similar content would, in most cases, have already been clustered together into events. Consequently, it is likely that the separate events being grouped together into a presentation grouping would not share a common time with one another. However, it may be useful to recognize commonalities in the time metadata that are not related to closeness-in-time. For instance, the app 134 may recognize that numerous content clusters or events occur on Thursday evenings from 6 pm to 8 pm. The app 134 may recognize this as a connection between the events, and therefore propose combining all events that occur on Thursday evenings from 6 pm to 8 pm as part of a presentation grouping.

At step 815, the app 134 uses the metadata from the combined events to create metadata for the presentation groupings. The presentation groupings and metadata are then stored at step 820 in the media organization data 139 or in the user data 189 on server 180.

Figure 9:
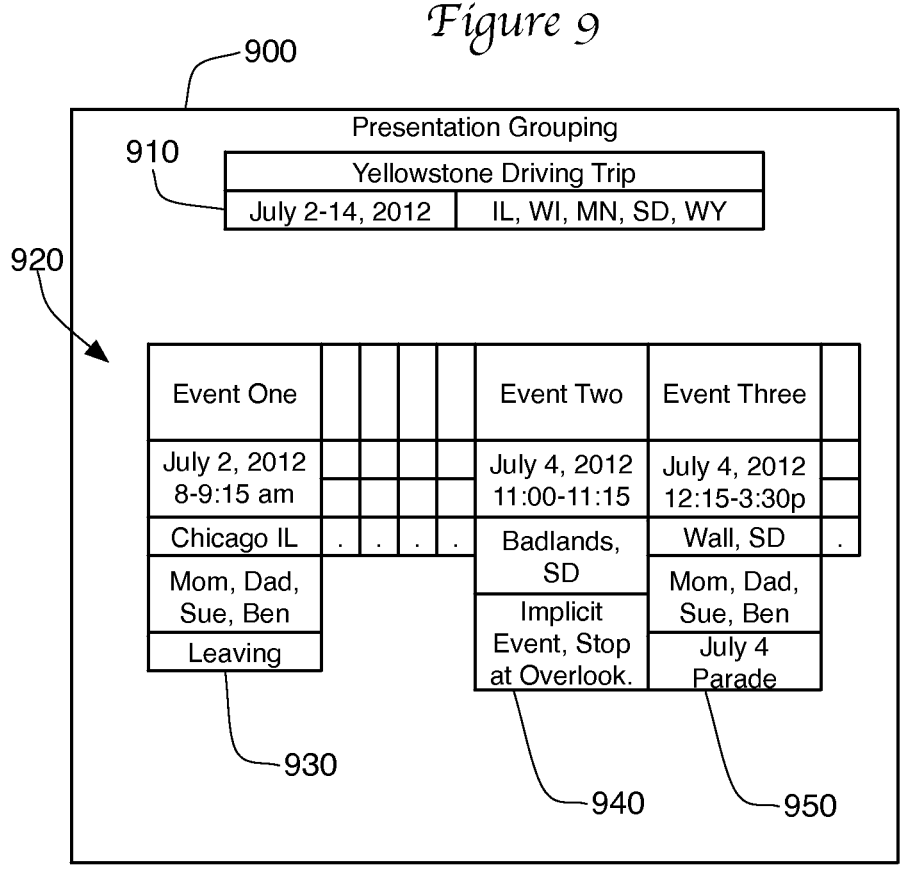
FIG. 9 is a schematic diagram of an example presentation grouping.

At step 820, the user is allowed to verify the presentation groupings created at step 810. The user is given the ability to add events or content 140 directly to a presentation grouping, or to remove events or content 140 from the presentation grouping. The user is also given the ability to modify the metadata, and to format the presentation grouping as desired by the user. As explained above, the presentation grouping may be used to create a web site, a slide show, or a video presentation of the combined content. As a result, numerous formatting options will be available to a user at step 825 to format the presentation grouping. At step 830, the user modifications to the presentation groupings are stored at locations 139 or 189, and the process 800 ends.
Presentation and Augmentation FIG. 9 shows a sample presentation grouping 900. The metadata 910 for this presentation grouping 900 shows that the events 920 that were grouped together all related to a family's Yellowstone driving trip that took place from Jul. 2 to Jul. 14, 2012. This presentation grouping 900 includes events 920 that took place in Illinois, Wisconsin, Minnesota, South Dakota, and Wyoming.

The presentation grouping 900 could include tens or even hundreds of events 920. FIG. 9 shows details for only three events, event one 930, two 940, and three 950. It should be understood that numerous events 920 might occur in before, between, or after these particular events 930, 940, 950. Event one 930 took place on Jul. 2, 2012 and related to leaving the family home in Chicago, Ill. Event two 940 took place in the Badlands of South Dakota on the morning of Jul. 4, 2013. Event three 950 took place when the family watched the parade in Wall, S. Dak. on Jul. 4, 2013.

Figure 10:
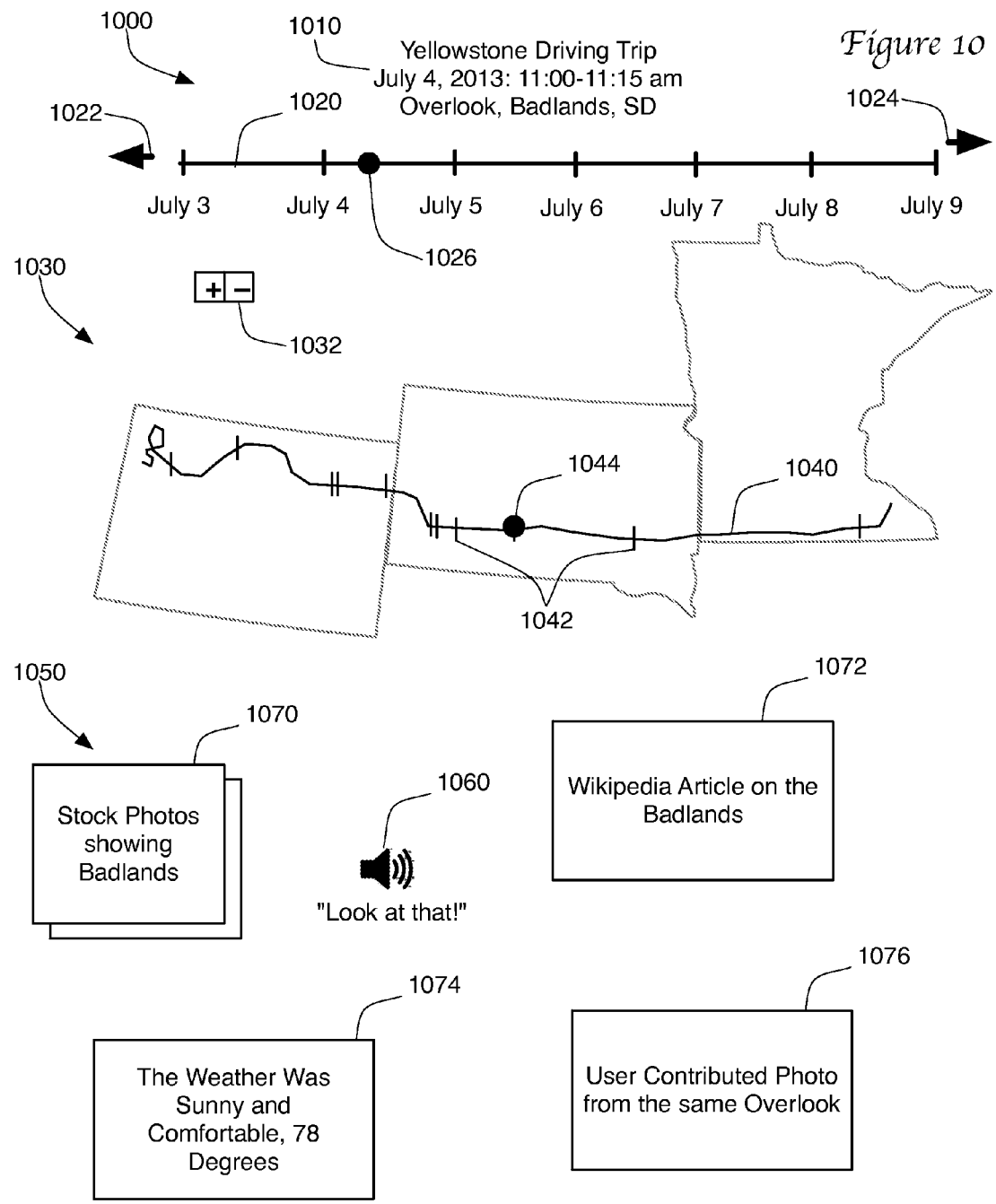
FIG. 10 is a schematic diagram of a user interface showing an event from the presentation grouping of FIG. 9.

The events in presentation grouping 900 are used to create the user interface 1000 shown in FIG. 10. In the preferred embodiment, the media organization server 180 creates the user interface 1000. This is true even if the presentation grouping 900 was created on the mobile device 100 using the media organization app 134. In one embodiment, when the presentation grouping 900 is created and stored in the media organization data 139, it is also uploaded via network 170 to the user content 189 stored on the media organization server 180. Alternatively, the content within the events 920 could have been uploaded to the server 180, and the server 180 could have assisted the user in creating the presentation grouping 900. One benefit to having the media organization server 180 create interface 1000 is that the interface 1000 could then be accessed by any user with access to the Internet 170. In one embodiment, the server 184 operates as a web server under the guidance of application programming 187, and the interface 1000 is a web interface provided over the Internet 170.

To create this interface 1000, the server 184 analyzes all of the events 920 in the presentation grouping 900, including the events one 930, two 940, and three 950. The earliest and latest times associated with these events 920 are identified (in this case, Jul. 2, 2013 and Jul. 14, 2013. A graphical timeline is then created that spans between these dates. In FIG. 10, this timeline 1020 shows a portion of the entire timeline of the presentation grouping 900. A user can see more of the timeline by selecting arrows 1022 and 1024. The user could also "zoom out" to see all of the timeline 1020 using user interface element 1032. The timeline 1020 includes a single time indicator, in this case a black circle 1026. The user can drag this circle 1026 along the timeline 1020 to input a desired time. In this case, the user has located the circle 1026 on Jul. 4, 2013. More specifically, Jul. 4, 2013, between 11:00 and 11:15 am, as indicated by the heading 1010 shown on the interface 1000. This time corresponds to event two 940.

In addition to the timeline 1020, the interface 1000 also includes a map 1030. Maps 1030 are particularly useful elements when displaying a presentation grouping 900 that includes a plurality of different locations. For this family trip to Yellowstone, the map 1030 will show the family's route during the vacation. In this case, the map 1030 shows the states that the family traveled in during the time shown on the timeline 1020 (namely between Jul. 3 and Jul. 9, 2013). A user can zoom into or out of the map 1030 using interface element 1032. In one embodiment, using interface element 1032 will simultaneously zoom both the timeline 1020 and the map 1030, with the map 1030 always showing locations covered by the time period shown in the displayed portion of the timeline 1020. In other embodiments, separate zoom interface elements 1032 will be provided for the timeline 1020 and the map 1030.

The map 1030 includes a path 1040 showing the path of the user along the timeline. In this case, the path 1040 shows a route through Minnesota, South Dakota, and Wyoming and into Yellowstone National Park. The path 1040 can be derived from the events 920 within the presentation grouping 900 being displayed. In most cases, the presentation grouping 900 will not have explicit information about every point on the path 1040, but instead will have multiple, discrete events 920 along the path 1040. The points along the path 1040 that are associated with actual events 920 in the presentation grouping 900 are shown in FIG. 10 with short line hash marks 1042 on the path 1040. The portions of path 1040 that exists between these locations can be filled in using an intelligent "guess." For instance, most of the events 920 occur on U.S. Interstate 90, so the server 180 can guess that the user traveled between these events 920 following the Interstate. Alternatively, the user can manually add the correct path 1040 between the locations of the events 920. In yet another embodiment, the path 1040 is not shown, and only the discrete locations 1042 of the events 920 are displayed on the map 1030.

As the current time marker 1026 is found on the timeline 1020 at the time of event two 940, a location marker 1044 is placed on the path 1040 at the location of event two 940. This location happens to be a scenic overlook off of Interstate 90 looking over the Badlands in South Dakota. To change the event 920 being viewed, a user is allowed to drag the time market 1026 along the timeline 1020. In one embodiment, the marker 1026 will only "stick" on the timeline 1020 at time periods that define a particular event 920. In this embodiment, movement of the time marker 1026 will cause a corresponding movement of the location marker 1044. Hence, if the time marker is moved to later in the day on Jul. 4, 2013 corresponding to event three 950, the location marker 1044 on the map interface 1030 will corresponding move to Wall, S. Dak. (as can be seen in interface 1100 shown in FIG. 11). The interface 1000 can be designed so that the user can similarly move the location marker 1044 along the path 1040 between events 920 and have the time marker 1026 move correspondingly along the timeline 1020. Note that while the hash markers 1042 identify events 920 on the path, there are no corresponding hash markers on the timeline 1020. Of course, such marks could be added to the timeline 1020. To the extent an event 920 exists over a long time period (such as two days), the mark 1026 on the timeline 1020 could be similarly long.

In the interface 1000 shown in FIG. 10, event two 940 was selected. The interface 1000 shows the content associated with this event 940 in content location 1050. In this case, event two 940 was an implicit event, which means that the user of the mobile device 100 did not explicitly direct the device 100 to take any video or still photos, to record any audio, or even make any note of the fact the car stopped at this overlook. However, process 600 detected a trigger event (such as the car stopping for more than ten minutes) and recorded the implicit content 138 that was the basis for this event 940. The implicit content included the fact that the car stopped at this overlook from 11:00 to 11:15 am, and it included the geographic location of this stop (within the Badlands of South Dakota). Furthermore, the user's monitoring mode in process 600 caused the device 100 to record any conversation that may have occurred. In this case, the device 100 captured daughter Sue exclaiming "Look at that," followed by the mother explaining how the Badlands were formed. The audio recording 1060 is provided in the content area 1050 of interface 1000, which allows the family to relive a memory that they did not explicit record.

Because the server 180 knows the time and location of this event 940, the server 180 is able to augment this data with content from third party information provider servers 194. In one example, the server 180 inquires about whether there are any locations of interest near this location. Various third parties provide public servers capable of providing this information, including Google Inc. (Menlo Park, Calif.). As this presentation grouping 900 is concerning a family vacation, the server 180 will be paying particular attention to tourist destination information. In this case, the third party information provider server 194 would indicate that this location is in the Badlands. As a result, the server 180 can populate the content area 1050 of the interface 1000 with stock photography 1070 showing the Badlands. In addition, the server 180 may include a portion of the WIKIPEDIA article on the Badlands by requesting this information from the Wikipedia server 194 (Wikipedia is provide by the Wikimedia Foundation, Inc. of St. Petersburg, Fla.). The server 180 also knows the time (11:00 am) for this event 940, so it can inquire about the weather at this time and place, and add this information 1074 to content area 1050.

Finally, the server 180 has within the user content data 189 information from many other users that have used the system 180. By accessing this information, the server 180 may be able to identify a photograph 1076 taken by another, unrelated user of the server 180 at that very same scenic overlook and include this photograph 1076 in the presentation 1000 of event 940. The use of content from other user's can be limited to that content that has been donated for public use by other users of the server system 180.

Figure 11:
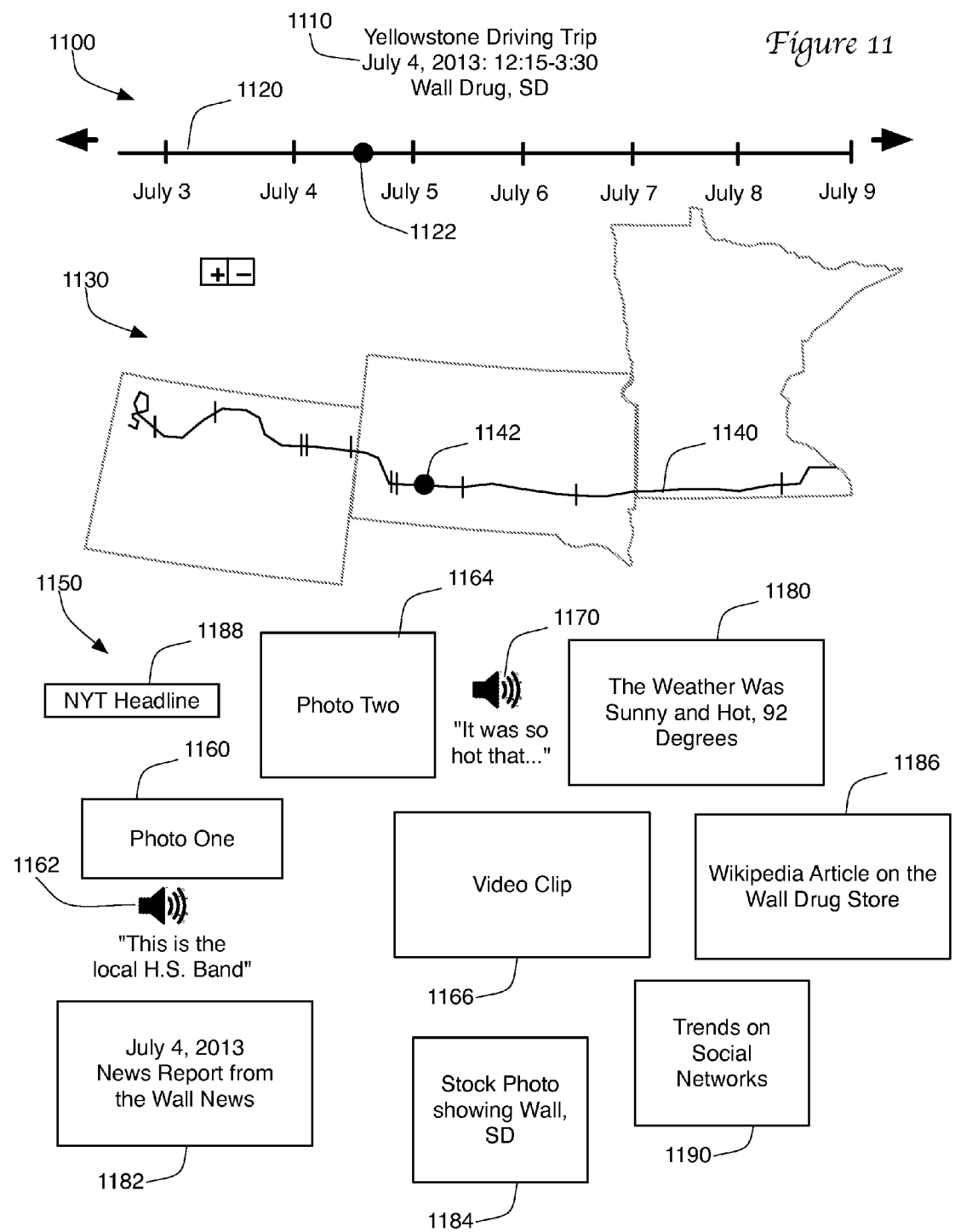
FIG. 11 is a schematic diagram of the user interface of FIG. 10 showing a different event from the presentation grouping of FIG. 9.

Interface 1100 in FIG. 11 displays content 1150 associated with event 950. As was the case with interface 1000, interface 1100 identifies at 1110 the time and place of this event 950, displays the timeline marker 1122 at the appropriate location on the timeline 1120 for the event 950, and further displays the location marker 1142 on the appropriate location along the path 1140. For event 950, the user did record explicit media content 136, namely photo one 1160, audio commentary taken during the event 950 describing photo one 1160, photo two 1164, and video clip 1166. This content is displayed in the content presentation area 1150 of interface 1100.

This area 1150 also includes some audio commentary 1170 that was added to this event 950 after-the-fact. Users are allowed to add content to events 950 from a variety of sources in order to enhance the presentation 1100 of those events. This can take the form of audio commentary 1170, which helps "tell the story" of the event 950. The commentary 1170 can be recorded the next day and connected to the event using the media organization app 134 on the mobile device 100, or weeks later when viewing the event 950 through interface 1100 via a web browser.

Like interface 1000, interface 1100 also includes augmentation from external data sources acquired over the Internet 170. In this case, the server added weather information 1180 for Wall, S. Dak. on Jul. 4, 2013 at 1:00 pm, a news report 1182 from the local paper for that day, and stock photography of Wall, S. Dak. 1184. By searching for nearby locations of interest, the server 180 would have identified Wall Drug and may have elected to include a Wikipedia article 1186 on the drug store. All of this information 1180-1186 relates directly to the location identified for this event 950. Information related primarily to the identified time for the event 950 by not the location may also be included. For instance, the headline from the New York Times 1188 could be included for this date, which would note any major event that may have been occurring elsewhere in the world, while interesting trends on the Internet or on social media 1190 could also be added.

While the content 1160-1190 in content presentation area 1150 may appear cluttered in FIG. 11, the server 1180 allows a user to pick and choose among the content 1160-1190 and to format this content 1160-1190 as they desire. This formatting information will be stored with the event 950, so that later viewers of the event 950 will see the preferred format for interface 1100.

Database

Figure 12:
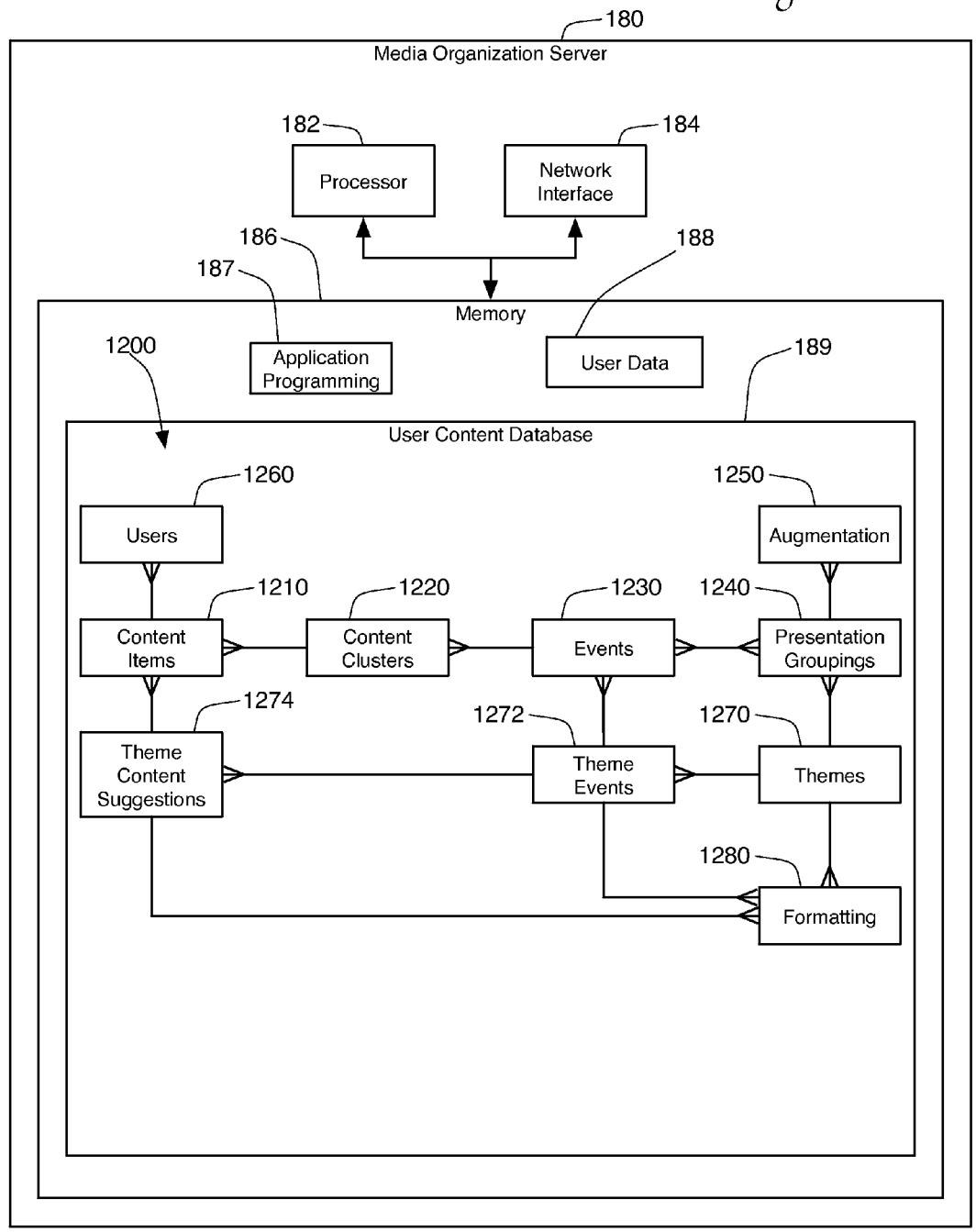
FIG. 12 is a schematic diagram showing a database used by a media organization server of the present invention.

FIG. 12 shows media organization server 180 with more detail provided related to the storage of user content 189. In FIG. 12, user content 189 is stored in a user content database 1200. The database 1200 is stored in the memory of the media organization server 180 as structured data (such as separate tables in a relational database, or as database objects in an object-oriented database environment). Database programming stored on the memory of the media organization server 180 directs the processor 182 to access, manipulate, update, and report on the data in the database 1200. FIG. 12 shows the database 1200 with tables or objects for content items 1210, content clusters 1220, user-confirmed events 1230, presentation groupings 1240, augmentations 1250, and users 1260. Relationships between the database entities are represented in FIG. 12 using crow's foot notation. For example, FIG. 12 shows that presentation groupings 1240 are associated with a plurality of user-confirmed events 1230, which are themselves associated with one or more content clusters 1220 that contain one or more content items 1210. Alternatively, content clusters 1220 and events 1230 can share a database entity definition, with the difference between the two types of data 1220, 1230 being reflected in a field value indicating whether the content cluster 1220 had been affirmed by a user and could now be viewed as a user-confirmed event 1230. Associations or relationships between the database entities shown in FIG. 12 can be implemented through a variety of known database techniques, such as through the use of foreign key fields and associative tables in a relational database model. In FIG. 12, associations are shown directly between two database entities, but entities can also be associated through a third database entity. For example, a user database entity 1260 is directly associated with one or more content items 1210, and through that relationship the user entity 1260 is also associated with user confirmed events 1230 and presentation groupings 1240.

Themes

The user content database also includes an entity for themes 1270, theme events 1272, theme content suggestions 1274, and formatting instructions 1280. As explained in further detail below, theme database entities 1270 help define themes for presentation groupings 1240. Themes 1270 can be directly associated with formatting instructions 1280 that are used to format the presentation grouping 1240. For instance, if presentation grouping 900 were association with a theme 1270, the interfaces 1000 and 1100 would be formatted according to formatting instructions 1280 associated with that theme 1270. The formatting instructions may be as simple as specifying fonts, colors, background images, and/or background music. Preferably, however, the formatting instructions 1280 will also specify formatting and presentation specifics for theme events 1272 and content items 1210 associated with theme content suggestions 1274.

Themes 1270 may be based on a life event (wedding, end-of-life, graduation, new baby, etc.) or family vacation (cruise, road trip) or other commonly shared life experiences (child's soccer season, freshman year at college, moving to a new house, a soldier's time in the army etc.). The themes 1270 for these events would provide more than color choices and suggested background music. In the preferred embodiment, the themes 1270 are designed to help a user tell a story. Professionals may identify the various events that are typically associated with a theme and create corresponding theme events 1272 for the theme. For instance, a "moving to a new house theme" 1270 may include a "house search" event 1272, a "signing the purchase contract" event 1272, a "closing" event 1272, a "moving day" event 1272, and a "housewarming event" 1272. The best manner to present these events 1272 can be considered by a professional in order to best tell the story of a family's new home. This may include ordering the events in an effective fashion, incorporating stock imagery, inserting humor, etc. In particular, the professional may have particular ideas about the kind of content that can help tell the story. For instance, it may be helpful to have a photograph of the family's new home with the "sold" sign still in front as part of the "house search" event 1272, and a picture of the home owners waiting for the real estate agent after signing the purchase agreement for the "signing the purchase contract event" 1272, and a picture of the moving van with boxes for the "moving day" event 1272. These elements can be added to the theme 1270 by defining theme content suggestions 1274 for the various theme events 1272. If the professional designing the theme 1270 can help select the content items 1210 that will make up the presentation groupings 1240, the formatting 1280 for the theme will be that much more effective. In effect, the theme 1270 (with the theme events 1272, theme content suggestions 1274, and formatting 1280) actually helps define the story elements that make for an effective presentation of the user's own story. By suggest content 1274 and events 1272 for the various story elements in the theme 1270, the server 180 will help even uncreative people feel creative.

Themes 1270 can be assigned to a presentation grouping 1240 automatically. By examining the events 1230 in a presentation grouping 1240, the server 180 can identify information about those events 1230. For instance, if all or most of the events 1230 in a presentation grouping 1240 contain metadata titles or descriptions relating to soccer games, a theme 1270 that was designed for presenting a sporting team's season could be assigned to that presentation grouping 1240. Similarly, a presentation grouping 1240 that contained events 1230 labeled "wedding shower," "groom's dinner," "ceremony," and "reception," would be assigned to a wedding theme 1270. In the preferred embodiment, the server 180 confirms the assignment of a suggested theme 1270 to a presentation grouping 1240 before applying the formatting 1280 to the presentation of the presentation grouping 1240.

Figure 13:
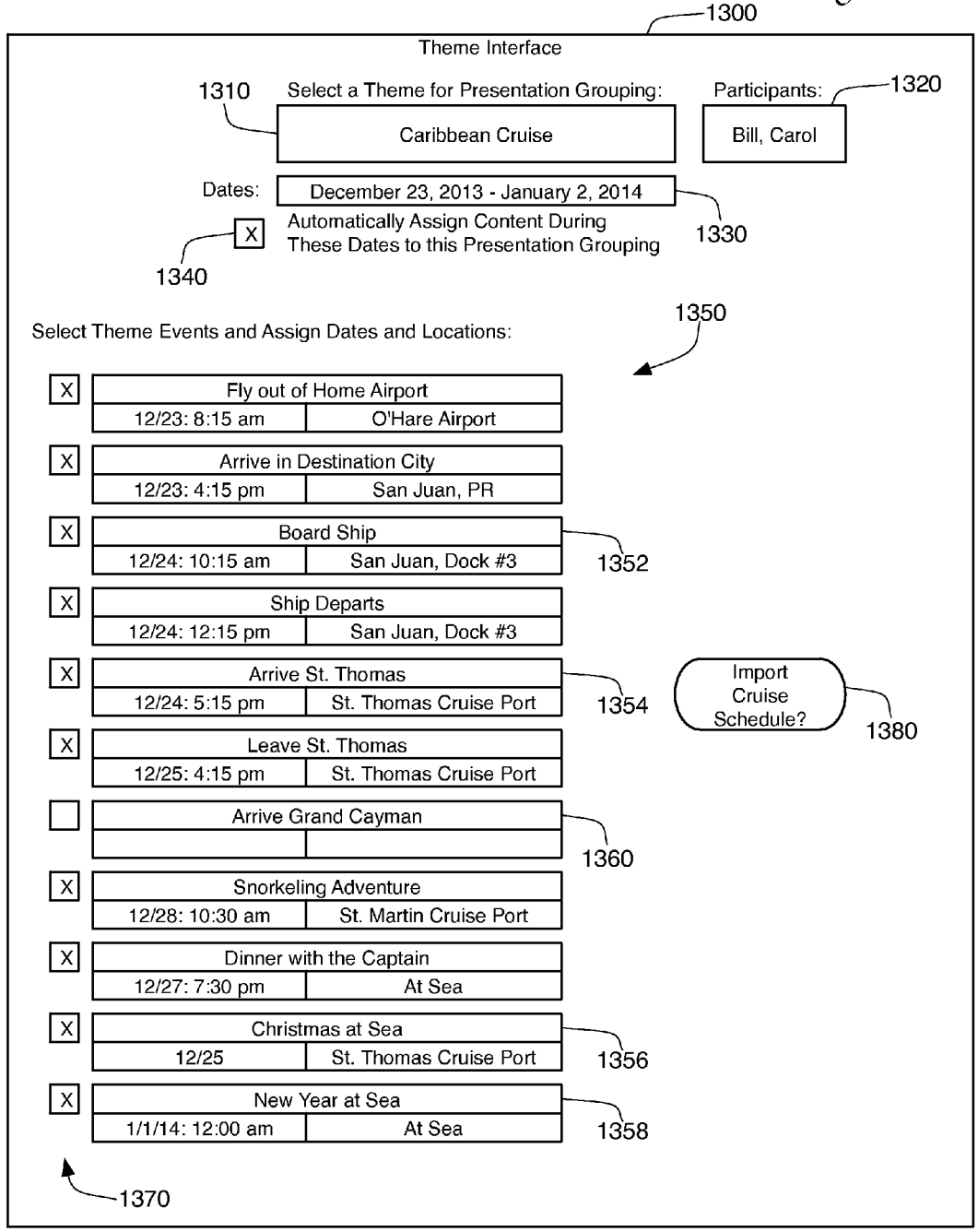
FIG. 13 is a schematic diagram showing a theme selection computer interface.

Themes 1270 can also be selected by a user, as shown in theme interface 1300 shown in FIG. 13. In this case, the user is selecting a theme 1270 for a future vacation. The user begins by selecting one of the pre-established themes 1270 through interface 1300. In this case, the user selected a Caribbean cruise theme 1310. The themes 1270 that are available for selection by the user can be presented in a variety of ways, such as through a pull down menu, a search interface, or a structured hierarchy of options. When a theme 1270 is selected for a future life event, the server 180 will create a new presentation grouping 1240 that will be organized and formatted according to the theme 1270. Alternatively, the user can manually assign the theme 1270 to an existing presentation grouping 1240 of already existing events 1230 and content items 1210.

Through interface 1300, the user can also specify the participants 1320, and the time frame for this cruise 1330. At element 1340, a check box is provided that, if selected, will cause the server 180 to automatically assign content 1210 taken by the user during time frame 1330 to the presentation grouping 1240. When the Caribbean cruise theme 1310 is selected, the interface 1300 will present to the users the theme events 1350 that are have been pre-defined for the elected theme 1310. In this case, the theme events 1350 all are common events that may be encountered during a Caribbean cruise, including boarding the cruise 1352 and arriving in the harbor at St. Thomas in the US Virgin Islands 1354. In addition, the server 180 ideally will identify special events that apply to the participants 1320 or the particular dates selected 1330 that may not apply in other instances of the theme 1310. For instance, in interface 1300 the listed theme events 1350 include Christmas at Sea 1356 and New Years at Sea 1358 because the specified date range 1330 included both of these holidays. If the interface 1300 identified the participants 1320 as a romantic couple, the included theme events 1350 might be different that if the participants 1320 were a family with children.

Each of the events 1350 are displayed in interface 1300 because the events 1350 are identified by theme event database entities 1272 that are associated with the theme database entity 1270 that was chosen at element 1310. Of course, not all of these elements 1350 are applicable to every Caribbean cruise. For instance, in this cruise Bill and Carol will not be visiting Grand Cayman 1360. To identify which of these suggested theme events 1350 are applicable to the user's planned vacation, the user can select or deselect particular events through checkboxes 1370. In interface 1300, the checkbox for the Grand Cayman arrival 1360 is unchecked. For each of the relevant events 1350 listed, the user is requested to enter a date and time for the event 1350, and a location for the event. For instance, for the Board Ship event 1352, the user indicated that this will occur on Dec. 24, 2013 at 10:15 am at San Juan cruise ship dock number 3. Although the server 180 allows the user to enter and edit this time and place information manually, automated assistance may be available in some cases. For instance, by selecting button 1380, the user can identify a particular cruise, and the relevant events 1350 will be selected and the time and date information will be inserted using publicly available information about that cruise.

Figure 14:
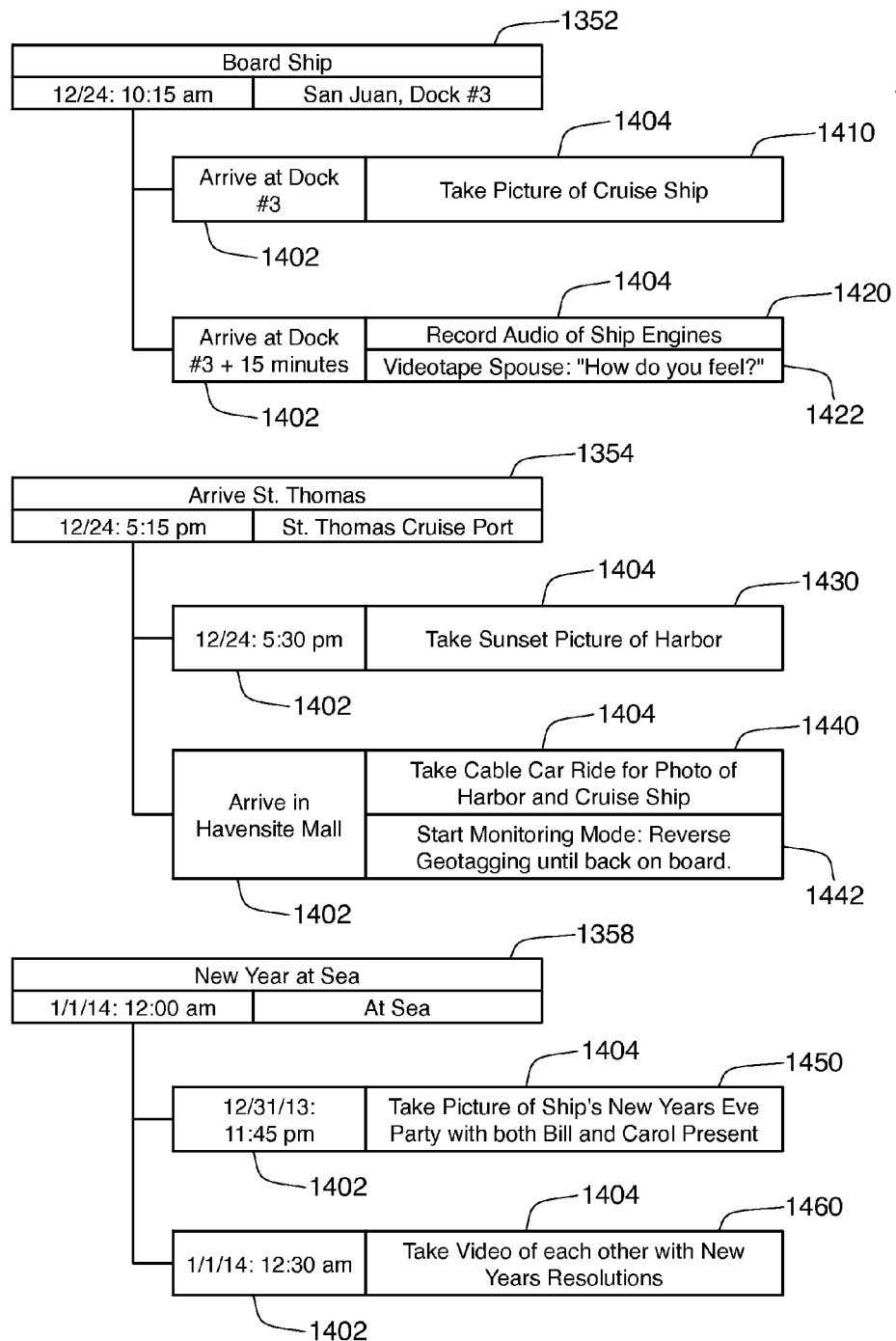
FIG. 14 is a schematic diagram showing the relationship between theme events and theme content suggestions.

Time and place information stored about upcoming theme events 1272 can be used to help users create suggested theme content 1274. As shown in FIG. 14, theme events 1352, 1354, and 1358 are associated with theme content suggestions 1410-1460. In particular, the board ship theme event 1352 is associated with three theme content suggestions 1410-1422. Each theme content suggestion 1410-1460 shown in FIG. 14 contains two parts, a trigger portion 1402, and a content portion 1404. For the first suggestion 1410, the trigger 1402 is arriving at dock number three of the San Juan cruise ship port. In this case, the trigger 1402 is the arrival at a particular geographic area. This is considered a trigger 1402 because the preferred embodiment uses this information in order to prompt the user to acquire the suggested content 1404. If these content suggestions 1410-1460 are stored in, or accessible from, a mobile device 100, the media content app 134 (or another, specialized app) can use these triggers 1402 to prompt the user to obtain the content 1404. The trigger 1402 can be defined as a geo-fence, in which the GPS sensor 158 (or other location sensors 150) monitors the location of the mobile device 100 and responds when the mobile device is at or near the predetermined location. In the examples of suggested content 1410, when the mobile device approaches dock #3 of the San Juan cruise ship port, the media content app 134 will alert the user (using, for example, an audible sound or a vibration) and show to the user on display 110 a request to obtain the suggested content 1410. In addition, the media content app 134 can monitor the mobile device 100 to identify when the users is making use of the device, and then request the suggested content 1410 at that point. For example, when a user answers or initiates a phone call on the mobile device 100, at the conclusion the app 134 can leverage the fact that the mobile device 100 has the user's attention and can prompt or remind the user of upcoming events 1352 or request suggested content 1410. If the user proceeds to take photographs using the mobile device 100 within a set period of time after the trigger event (e.g., within ten minutes), the media content app 134 will associate the created content items 1210 with this particular theme content suggestion 1274 (specifically suggestion 1410). This means that this photograph will appear within the formatted presentation grouping display automatically in the area that the professional who designed the theme 1310 intended without requiring any further interaction from the user. If multiple photographs were taken at this time, or if two theme content suggestions were pending at the same time, the app 134 may request that the user identify which theme content suggestion (if any) should be associated with the new content items 1210.

Suggested theme content 1420 and 1422 also are associated with board ship theme event 1352, but they both relate to a different trigger 1402. Here the trigger is set for fifteen minutes after arriving at the specified location of the event. Consequently, 15 minutes after arriving at the cruise ship dock, the mobile device 100 will request that the user record audio of the ship engines as they stand outside waiting to board the ship. The mobile device 100 will also request the user to videotape their spouse's response to the question "how do you feel?" Theme event 1354 similarly has three associated media content suggestions 1430, 1440, and 1442. Suggestion 1430 contains a time-based trigger set according to the time of the local sunset. Theme content suggestion 1440 suggests that the user visit a local tourist attraction, namely the cable car ride to the top of a high hill. In effect, this theme content suggestion 1440, which is triggered when the visitor enters a particular area of St. Thomas, is acting as a tour guide. When the user disembarks and enters the Havensight Mall area, their mobile device 100 will alert them to an interesting activity 1440. In addition, the same trigger 1402 of arriving at Havensight Mall can also trigger a monitoring mode at step 610 for the gathering of implicit content 138. In this case, the trigger 1402 causes the mobile device 100 to enter geotagging mode, allowing the device 100 to track the movements of the user while on the island. The monitoring mode will stop the geotagging when the user returns onboard the ship. Finally, theme content suggestions 1450 and 1460 utilize a time trigger 1402 based directly on the time of the theme event 1358, with theme content suggestion 1450 being triggered fifteen minutes before theme event 1358 and theme content suggestion 1460 being triggered thirty minutes after theme event 1358.

Figure 15:
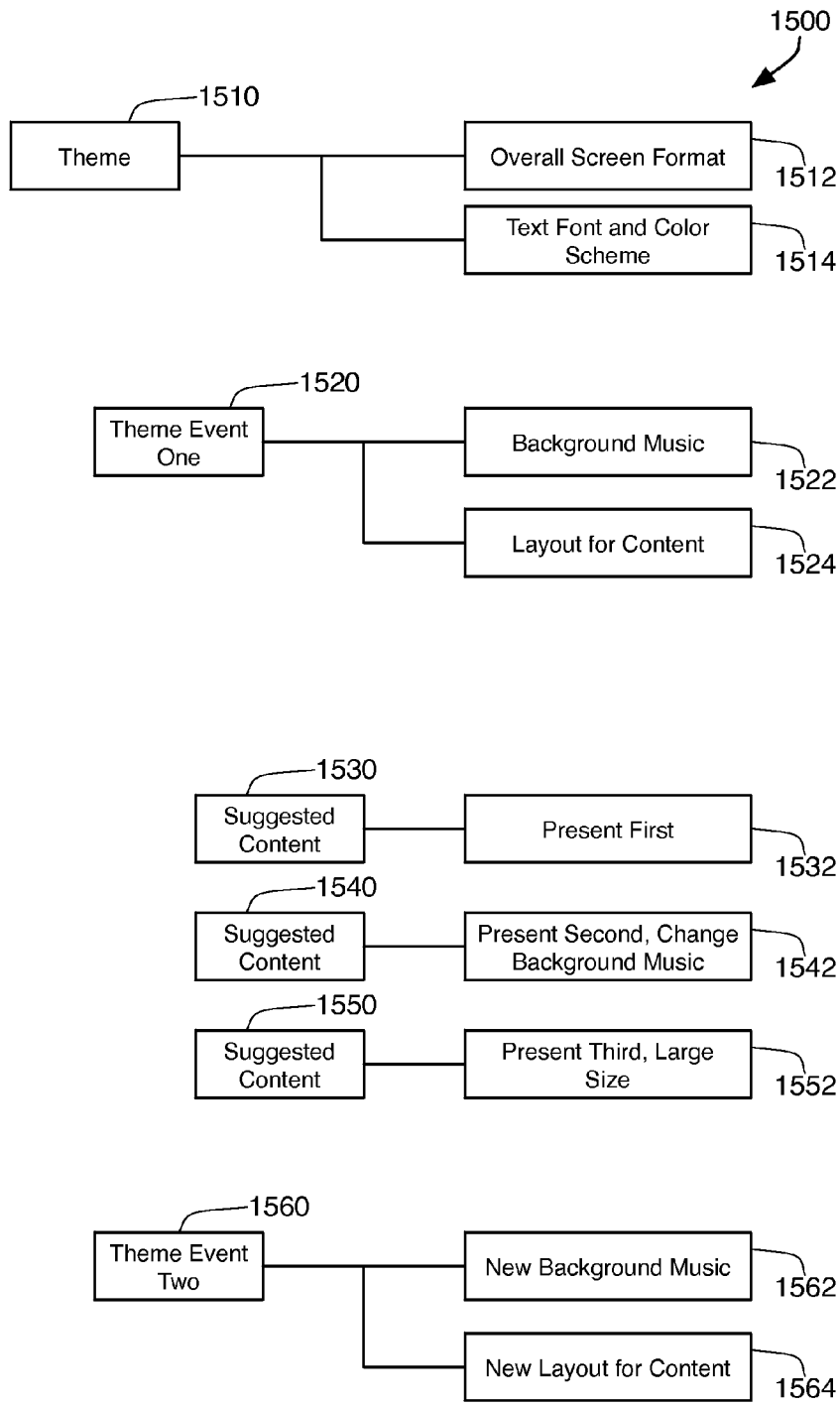
FIG. 15 is a schematic diagram showing the relationship between formatting instructions and theme content.

FIG. 15 shows how formatting instructions 1280 in database 1200 can be applied to different components of a theme, including the theme database entity 1270, theme events 1272, and even individual theme content suggestions 1274. As shown in FIG. 15, the overall screen format 1512 and the text font and color scheme 1514 formatting instructions apply to the overall theme 1510. Theme event one 1520 and two 1560 are associated with different background music 1522, 1562, respectively, and are associated with different layouts 1524, 1564, respectively. The three theme content suggestions 1530, 1540, and 1550 are also individually formatted. Formatting instructions 1280 can take a variety of forms, including the ordering of the appearance of events 1520, 1560 or content 1530, 1540, 1550. Formatting instructions 1532 requires that suggested content 1530 be presented first, while formatting 1542 changes the background music while presenting content 1540 second. According to formatting instructions 1552, suggested theme content 1550 is presented third and in a large size.

Theme Method

Figure 16:
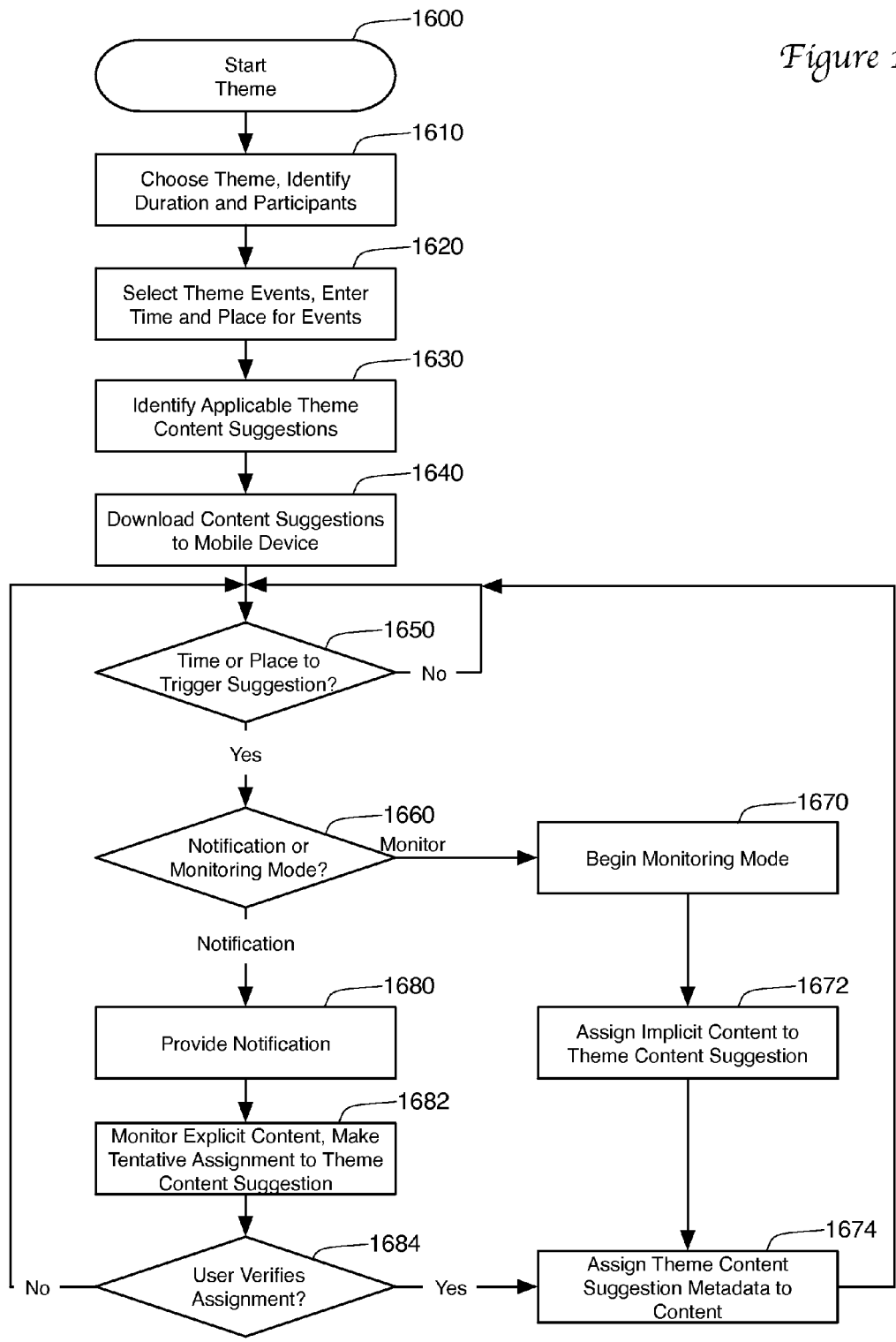
FIG. 16 is a flow chart showing a method of assigning content to a theme content suggestion.

Themes can be implemented using the method 1600 shown in FIG. 16. This method 1600 starts at step 1610 by allowing a user to select a theme 1270 for a presentation grouping 1240, and to identify the duration and participants for this presentation grouping 1240. Once the theme 1270 has been chosen, a user interface can present theme events 1272 that are associated with that theme in the database 1200. The user can select relevant theme events 1272, and for each relevant theme event 1272 enter an expected time and place for that event 1272 (step 1620). In some circumstances, a user may be able to import this information, but more typically the user will enter the dates and times manually. At step 1630, the method 1600 will identify theme content suggestions 1274 for the selected relevant theme events 1272. These suggestions 1274 may be associated with triggers that are calculated based on the time and/or place assigned to the related theme event 1272, in which case the triggers for the theme content suggestions 1274 will also be determined in step 1630.

In one embodiment, the user can select a theme and perform steps 1610-1630 on media organization server computer 180. In this embodiment, the theme suggestions 1274 and related triggers will need to be downloaded to the mobile device 100 at step 1640. In other embodiments, the app 134 on the mobile device 100 will assist the user with steps 1610-1630. In these embodiments, the content suggestions 1274 will already be found on the mobile device 100 and step 1640 can be skipped.

At step 1650, the mobile device 100 monitors the triggers associated with the content suggestions 1274. If it is not the time or place for a suggestion 1274 to trigger, step 1650 simply repeats. If a trigger is noted, step 1660 determines whether or not the triggered theme content suggestion 1274 relates to the gathering of implicit content 138, or a notification to the user to gather explicit content 136. If the suggestion 1274 relates to implicit content 138, the theme content suggestion 1274 will identify or define a monitoring mode and start process 600 (step 1670 in FIG. 16). When process 600 has created the implicit content 138, step 1672 will assign the created content item 1210 with the triggered theme content suggestion 1274. Because each theme content suggestion 1274 will contain information about the content that it is requesting, this information can be assigned to the metadata for the created content item 1210 in step 1674. The process 1600 would then return to step 1650 to wait for the next suggested media content 1274 to trigger.

If step 1660 determines that the triggered suggested media content 1274 requires a request that the user gather explicit content 136, then step 1680 will provide a notification containing that request through the mobile device 100. As explained above, this notification may include an audible indicator or a vibration on the mobile device 100 as well as a written notification on display 110. In the preferred embodiment, these notifications are provided through the notification system provided by the operating system of the mobile device 100 (such as iOS or ANDROID). At step 1682, the mobile device 100 is monitored to see if any explicit content 136 were created within a preset time period of the notification provided in step 1680. If so, the mobile device 100 will make a tentative assignment within its media organization data 139 between this newly created content item 1210 and the triggered theme content suggestion 1274. In most embodiments, the user will be given the opportunity to verify this connection at step 1684. If the user rejects the assignment, then the assignment is deleted in media organization data 139 and the method returns to step 1650. If the user confirms the relationship between the newly created content item 1210 and the triggered theme content suggestion 1274, then the descriptive information found in database entity 1274 is assigned to the metadata of the content item 1210 in step 1674, and the method returns to step 1650 to await the next triggering event.

Figure 17:
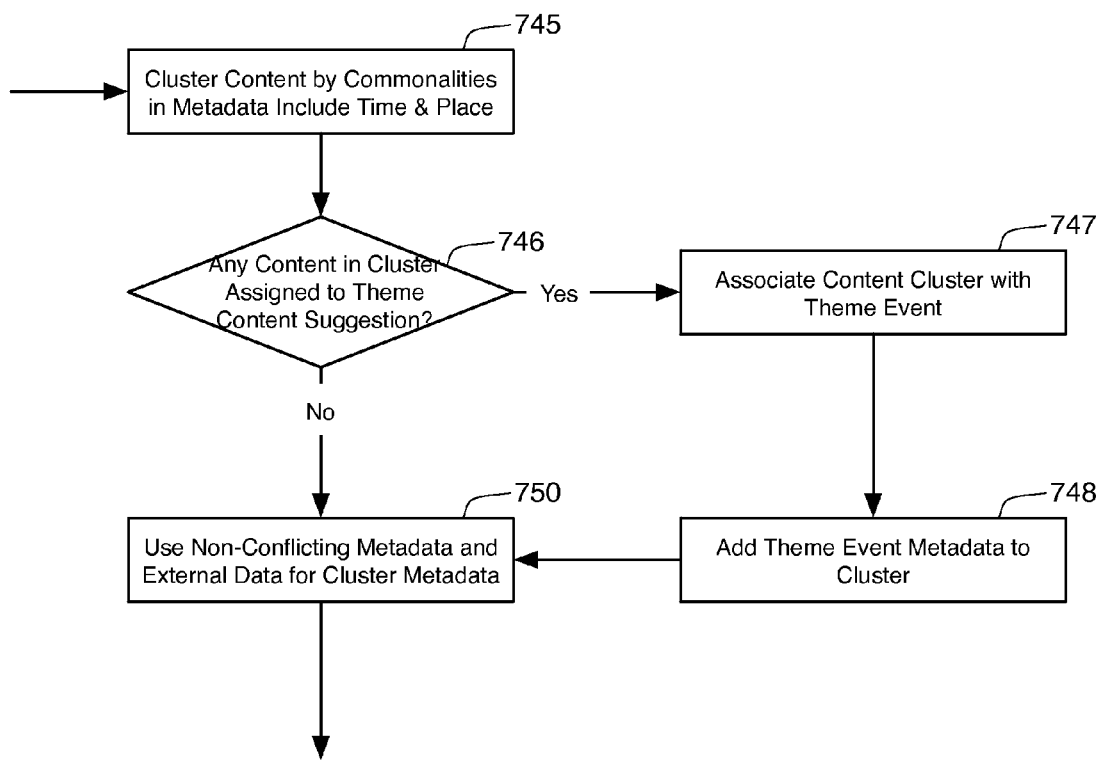
FIG. 17 is a portion of the flow chart shown in FIG. 7 modified to reflect theme assignments.

The use of themes 1270, theme events 1272, and theme content suggestions 1274 can improve the content clustering process 700 described above in association with FIG. 7. In particular, FIG. 7 shows step 745 as clustering content by commonalities in the content metadata, including time and place metadata. As FIG. 17 shows, this process 700 can be improved by adding steps 746, 747, and 748 to process 700. FIG. 17 shows only that portion of process 700 that was changed using the theme related data, as the other portions of process 700 remain as shown in FIG. 7. In the improvement, clusters that are formed at step 745 are examined in step 746 to see if they contain any content items 1210 that are associated with theme content suggestions 1274. If so, step 747 associates the entire content cluster 747 with the theme event 1272 associated with that theme content suggestion 1724. At step 748, metadata associated with the theme event 1272 including a title or description (e.g. "Board Cruise Ship") is assigned to the cluster. The process 700 then returns to step 750 and continues as shown in FIG. 7.

Figure 18:
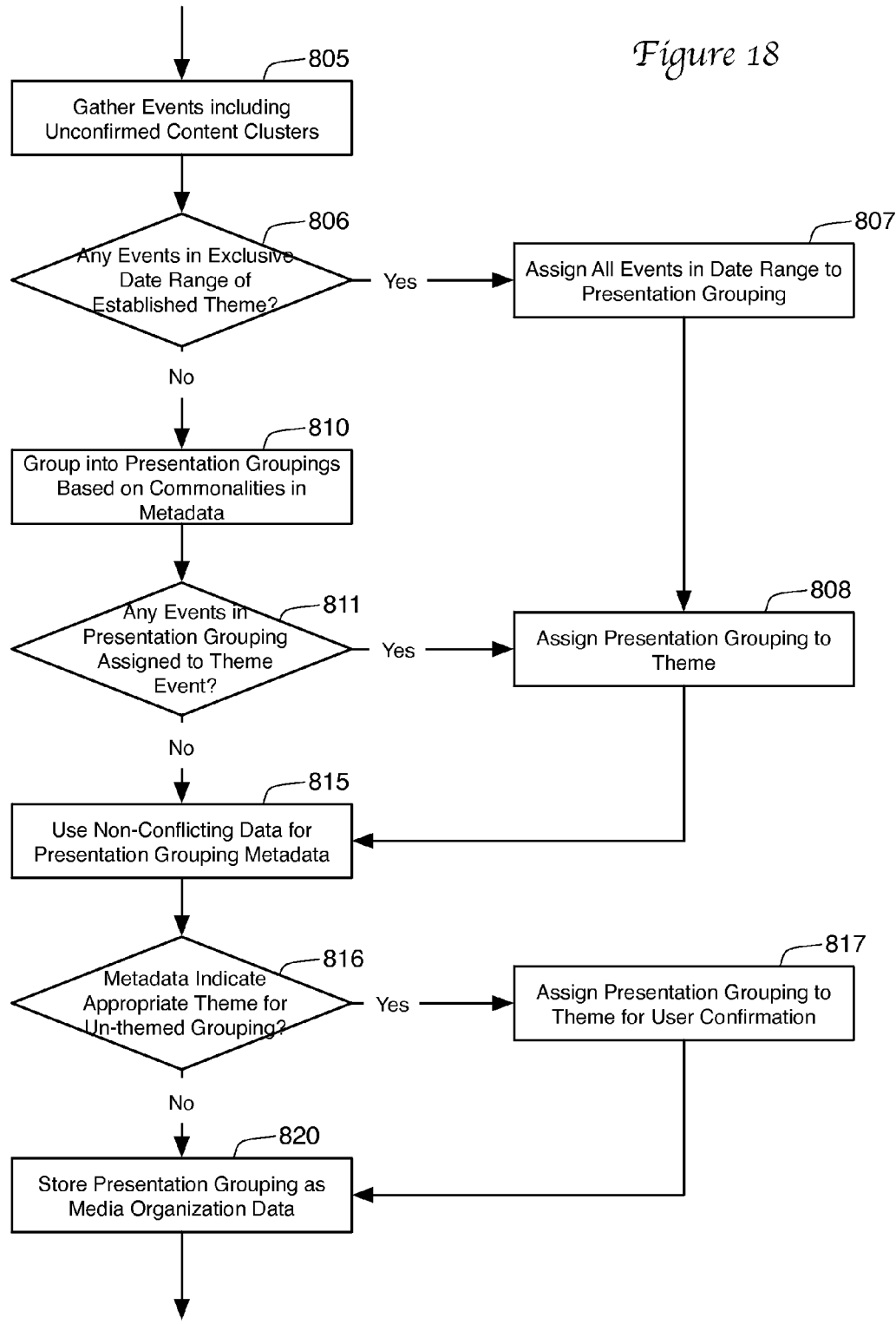
FIG. 18 is a portion of the flow chart shown in FIG. 8 modified to reflect theme assignments.

Similarly, FIG. 18 shows improvements to presentation grouping process 800 shown in FIG. 8. In this case, after step 805 gathers events 1230 (including unconfirmed content clusters 1220), step 806 determines if any of the events 1230 are within an exclusive date range of an established theme 1270 for the current user. As described above in connection with element 1340 of interface 1300, the user can establish that all content acquired during a date range 1330 is to be assigned to the theme 1270 (1310) and its associated presentation grouping 1240. If so, then step 807 assigns all of these events 1230 to a single presentation grouping 1240 and then, in step 808, assigns that presentation grouping to the appropriate theme 1270. If step 807 determines that a presentation grouping 1240 is already associated with the appropriate theme 1270, the events 1230 will simply be assigned to that existing theme.

If step 806 did not find any events 1230 within the date range 1330 of an established theme 1270, then step 810 will continue to group these items 1220, 1230 into presentation groupings 1240 based on commonalities in the metadata 810. When the user establishes one or more themes 1270, the data retained about these themes 1270 can assist process 800 in this step 810. For example, a user may establish a themed presentation grouping 1240 about his model railroad hobby. This presentation grouping 1240 includes a variety of temporally sparse events 1230 that happen to occur at common location. The theme 1270 associated with this grouping 1240 may be assigned geographic areas of interest as well as persons of interest. Step 810 can recognize these elements when assigning events 1230 into presentation groupings 1240, which will bias the assignment of a content cluster 1220 or event 1230 that shares these elements to this themed presentation grouping 1240. At step 811, the events 1230 within the presentation grouping 1240 are analyzed to determine if any of the events 1230 are currently associated with a theme event 1272 in database 1200. If so, the presentation grouping 1240 is assigned to the appropriate theme in step 808.

At step 815, non-conflicting metadata for the events is used to create metadata for the presentation group 1240. At step 816, this metadata is analyzed and compared to the pre-defined themes 1270 to see if this presentation grouping 1240 may be appropriate for association with one of the themes 1270. Of course, step 816 will only perform this analysis if the presentation grouping 1240 is not currently assigned to any theme 1270. If step 816 does find an appropriate theme, step 817 assigns the theme 1270 to the presentation grouping 1240, thereby allowing the formatting instructions 1280 associated with the theme 1270 to be used to present the presentation grouping 1240. Once a theme 1270 is assigned to the presentation grouping 1240, the user can assist in the assignment of existing events 1230 within the presentation grouping 1240 with theme events 1272 for the defined theme 1270, and the assignment of content items 1210 to suggested theme content 1274. User input may also indicate that the assignment made in step 817 is inappropriate, in which case the assignment would be removed from the database 1200. Also, as explained above, a user is free to manually assign their existing presentation groupings 1240 to the predefined themes 1270 whenever they see fit. If the step 816 did not find a match between the metadata of the presentation grouping 1240 and a theme 1270, or in any case after step 817, step 820 stores the presentation grouping as media organization data 139 and/or as user content 189.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computing device comprising:
   a) a processor that is controlled via programming instructions;
   b) a non-transitory computer readable memory;
   c) database programming stored on the non-transitory computer readable memory and performed by the processor, the database programming managing a content database that is transformed during operation by the database programming, the content database having:
      i) a plurality of media content database entities containing media content,
      ii) a theme database entity identifying a theme,
      iii) a plurality of theme event database entities each identifying a theme event for the theme, with each theme event database entity event being associated with the theme database entity;
      iv) a plurality of content suggestion database entities each identifying a content suggestion for one theme event, with each content suggestion database entity being associated with a single theme event database entity;
      v) a plurality of formatting instructions for displaying data through a user interface, the formatting instructions being applicable to at least one content suggestion database entity associated with the theme database entity;
   d) content presentation programming stored on the memory and performed by the processor, the content presentation programming causing the processor to:
      i) identify a first media content as relating to a first content suggestion;
      ii) associating in the database a first media content database entity identifying the first media content with a first content suggestion database entity identifying the first content suggestion;
      iii) identifying a first formatting instruction applicable to the first content suggestion database entity;
      iv) applying the first formatting instruction to the first media content and displaying the formatted first media content via a user interface.

2. The computing device of claim 1, wherein the first formatting instruction controls a presentation order for theme events associated with the theme.

3. The computing device of claim 1, wherein the first formatting instruction is chosen from a set of formatting instructions consisting of:
   i) stock photography instructions that cause a predetermined photograph to be presented on the user interface along with the first media content,
   ii) audio instructions that cause particular audio to be presented on the user interface along with the first media content, and
   iii) filtering instructions that cause a visual filter to be applied to the first media content before presentation on the user interface.

4. The computing device of claim 1, wherein the content presentation programming identifies the first media content as relating to the first content suggestion by accepting user input through the user interface identifying the relationship.

5. The computing device of claim 4, wherein the user identifies future media content as relating to the first content suggestion, and further wherein the first media content is created after the user identification.

6. The computing device of claim 1, wherein the content presentation programming identifies the first media content as relating to the first content suggestion by:
   (1) identifying a trigger event based on the data within the first content suggestion database entity;
   (2) assigning content created after the trigger event as being related to the first content suggestion.

7. The computing device of claim 6, wherein information about the trigger event is downloaded from the computing device to a separate mobile device, and further wherein the separate mobile device identifies the trigger event, creates the content assigned after the trigger event, and assigns the content created after the trigger event as being related to the first content suggestion.

8. The computing device of claim 7, wherein a confirmation user interface allows a user to confirm the assignment of the first media content being related to the first content suggestion.

9. The computing device of claim 8, wherein the confirmation user interface is presented on the mobile device that created the content.

10. The computing device of claim 6, wherein the user interface presents a plurality of theme events associated with a selected theme, and further wherein the user interface allows a user to select a subset of relevant theme events associated with the selected theme.

11. The computing device of claim 10, wherein the user interface allows a user to input a future time and place for the each theme event in the subset of relevant theme events, and further wherein the trigger event is based on the user input for a first relevant theme event associated in the database with the first content suggestion.

12. The computing device of claim 11, wherein the trigger event is based on a trigger time directly calculated from the time input by the user for the first relevant theme event.

13. The computing device of claim 11, wherein the trigger event is based on a geo-fence directly determined from the place input by the user for the first relevant theme event.

14. A method comprising:
   a) on a server computer having a programmable processor, establishing a structured database defining a theme, the theme being associated with a plurality of theme events, and at least one theme event being associated with a plurality of content suggestions;

b) at the server computer, storing formatting instructions defining content formatting for the content suggestions;

c) at a mobile device, downloading the plurality of content suggestions from the server computer;

d) the mobile device, creating content;

e) at the mobile device, identifying the content as being associated with a first content suggestion;

f) uploading from the mobile device to the server computer the content and the association with the first content suggestion; and g) at the server computer, presenting over a user interface the content as formatted by content formatting defined for the first content suggestion.

15. The method of claim 14, wherein the mobile device provides notification through a mobile device user interface notifying a user to obtain content for the first content suggestion.

16. The method of claim 14, wherein the content suggestions are associated with a theme event selected by a user over a theme selection user interface.

17. The method of claim 16, wherein the user first selects the theme over the theme selection user interface, and then selects multiple theme events from the plurality of theme events associated with the theme, wherein the plurality of content suggestions are associated in the structured database with the multiple theme events.

18. The method of claim 17, wherein the user inputs time and place information about a first relevant theme event associated with the first content suggestion.

19. The method of claim 18, wherein the user receives a prompt on the mobile device to obtain the content associated with the first content suggestion, and wherein the prompt is triggered based on the information input by the user about the first relevant theme event.

20. The method of claim 19, wherein the mobile device identifies the content as being associated with the first content suggestion by identifying that the content was created within a preset time period after the prompt on the mobile device.

21. The method of claim 18, wherein the mobile device records implicit content as the content after a trigger event, wherein the trigger event is based on the information input by the user about the first relevant theme event.

22. A computing device comprising:
a) a processor that is controlled via programming instructions;
b) a non-transitory computer readable memory;
c) database programming stored on the non-transitory computer readable memory and performed by the processor, the database programming managing a content database that is transformed during operation by the database programming, the content database having:
 i) a plurality of theme database entities identifying a plurality of themes,
 ii) a plurality of theme event database entities each identifying a theme event, with each theme event database entity event being associated with one theme database entity;
 iii) a plurality of content suggestion database entities each identifying a content suggestion for one theme event, with each content suggestion database entity being associated with a single theme event database entity;
d) theme selection programming stored on the memory and performed by the processor, the theme selection presentation programming causing the processor to create a theme selection interface and to:
 i) present, through the theme selection interface, the plurality of themes;
 ii) receive, through the theme selection interface, a theme selection of a first theme identified by a first theme database entity;
 iii) present, through the theme selection interface, a first set of theme events, the first set of theme events being identified by theme event database entities associated with the first theme database entity;
 iv) receive, through the theme selection interface, theme event selections identifying relevant subset of the first set of theme events;
 v) receive, through the theme selection interface, a location input and a time input for a first theme event in the relevant subset of theme events, the first theme event being identified by a first theme event database entity;
 vi) identify a first content suggestion identified in a first content suggestion database entity associated with the first theme event database entity;
 vii) use the input for the first theme event to identify a trigger event for input of content for the first content suggestion.

23. The computing device of claim 22, wherein the trigger event is a trigger for the creation of implicit content.

24. The computing device of claim 22, wherein the trigger event is a trigger for presenting a notification on a mobile device interface requesting the creation of explicit content.

* * * * *